(12) United States Patent
Wei

(10) Patent No.: US 11,512,717 B2
(45) Date of Patent: Nov. 29, 2022

(54) DIGITAL-SWITCHING FLUIDIC POWER SUPPLY AND HYDROSTATIC TRANSMISSION WITH REGENERATIVE BRAKE

(71) Applicant: Yanming Wei, Mountain (CA)

(72) Inventor: Yanming Wei, Mountain (CA)

( * ) Notice: Subject to any disclaimer, the term of this patent is extended or adjusted under 35 U.S.C. 154(b) by 219 days.

(21) Appl. No.: 16/354,251

(22) Filed: Mar. 15, 2019

(65) Prior Publication Data
US 2019/0211850 A1    Jul. 11, 2019

(51) Int. Cl.
| | |
|---|---|
| *F15B 11/20* | (2006.01) |
| *B60K 6/12* | (2006.01) |
| *F15B 13/04* | (2006.01) |
| *F15B 21/14* | (2006.01) |
| *F15B 1/027* | (2006.01) |

(52) U.S. Cl.
CPC ............... *F15B 11/20* (2013.01); *B60K 6/12* (2013.01); *F15B 1/027* (2013.01); *F15B 13/0402* (2013.01); *F15B 21/14* (2013.01); *F15B 2211/212* (2013.01); *F15B 2211/411* (2013.01); *F15B 2211/50* (2013.01); *F15B 2211/7054* (2013.01); *F15B 2211/7107* (2013.01); *F15B 2211/88* (2013.01)

(58) Field of Classification Search
CPC ...... F15B 11/20; F15B 13/0402; F15B 21/14; F15B 1/027; F15B 2211/88; F15B 2211/7107; F15B 2211/7054; F15B 2211/411; F15B 2211/50; F15B 2211/212; F15B 2211/6309; F15B 2211/6323; F15B 3/00; B60K 6/12; F16H 43/00
See application file for complete search history.

(56) References Cited

U.S. PATENT DOCUMENTS

| | | | | | |
|---|---|---|---|---|---|
| 2,085,303 | A | * | 6/1937 | Ernst | ........................ F15B 11/20 60/376 |
| 2,570,592 | A | * | 10/1951 | Price | ........................ F15B 11/20 451/24 |
| 3,120,314 | A | * | 2/1964 | King | ........................ F15B 11/20 414/708 |
| 3,511,073 | A | * | 5/1970 | Williamson | ............ F15B 11/20 72/384 |
| 7,475,538 | B2 | * | 1/2009 | Bishop | ........................ E02F 9/22 60/567 |
| 9,771,957 | B2 | * | 9/2017 | Maier | .................. F15B 11/0365 |
| 2004/0005210 | A1 | * | 1/2004 | Alexander | ........... B65G 69/003 414/401 |
| 2018/0180034 | A1 | * | 6/2018 | Wei | ........................ B01D 69/10 |

FOREIGN PATENT DOCUMENTS

| | | | | | |
|---|---|---|---|---|---|
| DE | | 19822439 A1 | * | 2/1999 | .......... F15B 11/0365 |
| DE | 102017102307 B3 | * | 4/2018 | .............. F15B 11/20 |
| GB | | 967164 A | * | 8/1964 | .............. E21D 23/16 |
| WO | WO-2016080874 A1 | * | 5/2016 | .............. F15B 15/02 |

* cited by examiner

Primary Examiner — Michael C Zarroli

(57) ABSTRACT

A series train of symmetrical dual rod-end double-action hydraulic cylinders with a cross sectional area in a series of powers of 2. The cylinders have corresponding computer controlled valves. The cylinders are switchable into three states. One state of shortcutting 2 fluid ports, another state of driving towards each opposite direction of reciprocation and the third state of idling. In the cylinder train all same polarity ports of the valve assembly are connected by hoses or pipes to align towards the same orientation to enable synchronous reciprocal motion and train power output.

1 Claim, 14 Drawing Sheets

FIG. 1 Hydraulic DC-DC, but this mimic not mature
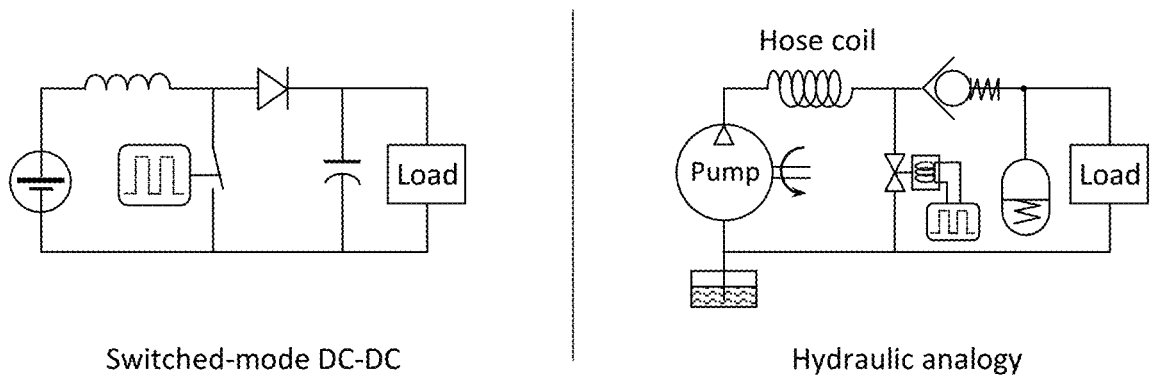
Switched-mode DC-DC  Hydraulic analogy
FIG. 2 Common parts & its makeshift
Double rod-end cylinder
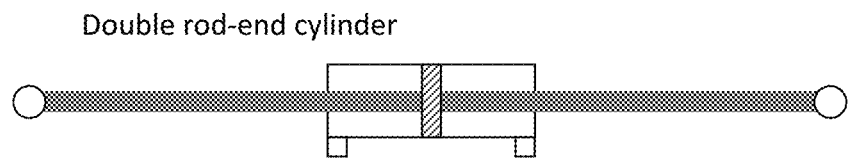
Equivalent mimic
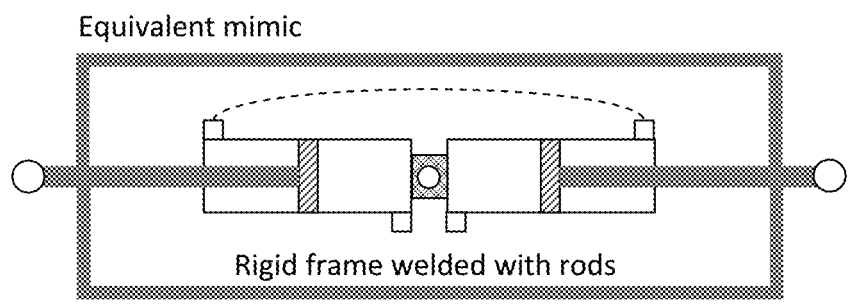
Rigid frame welded with rods
Not equivalent ∵ left acting or active area < right one
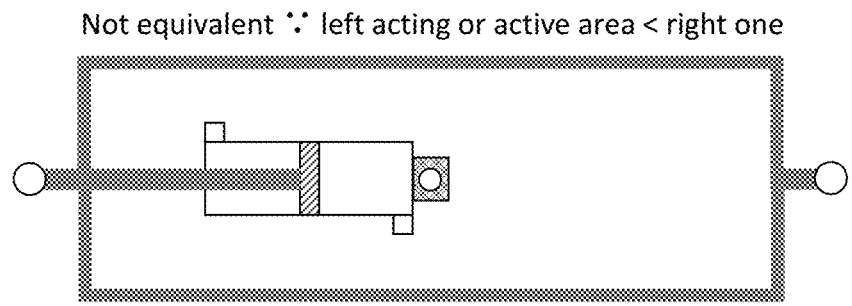

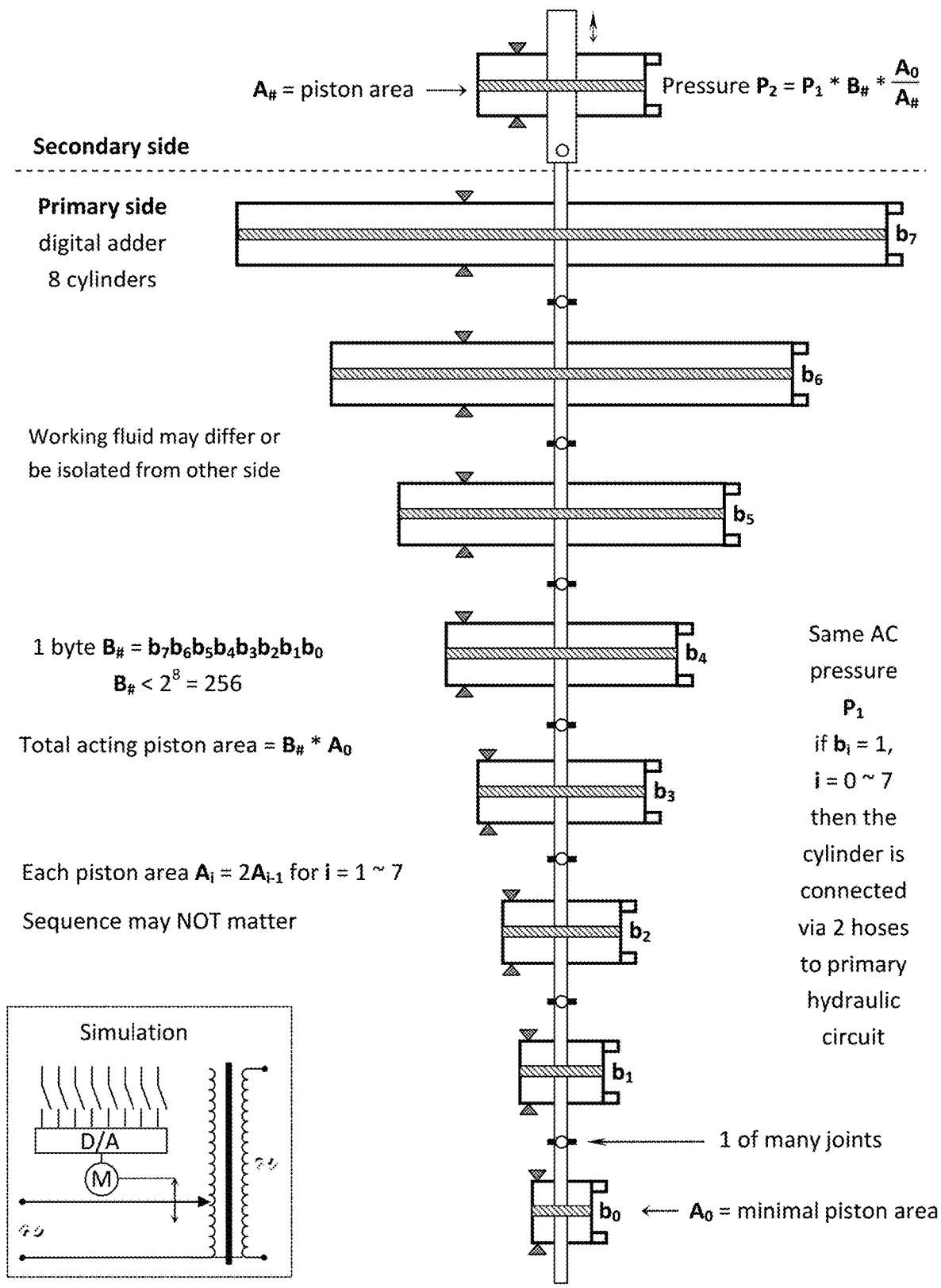
FIG. 3 Digital hydraulic AC linear transformer

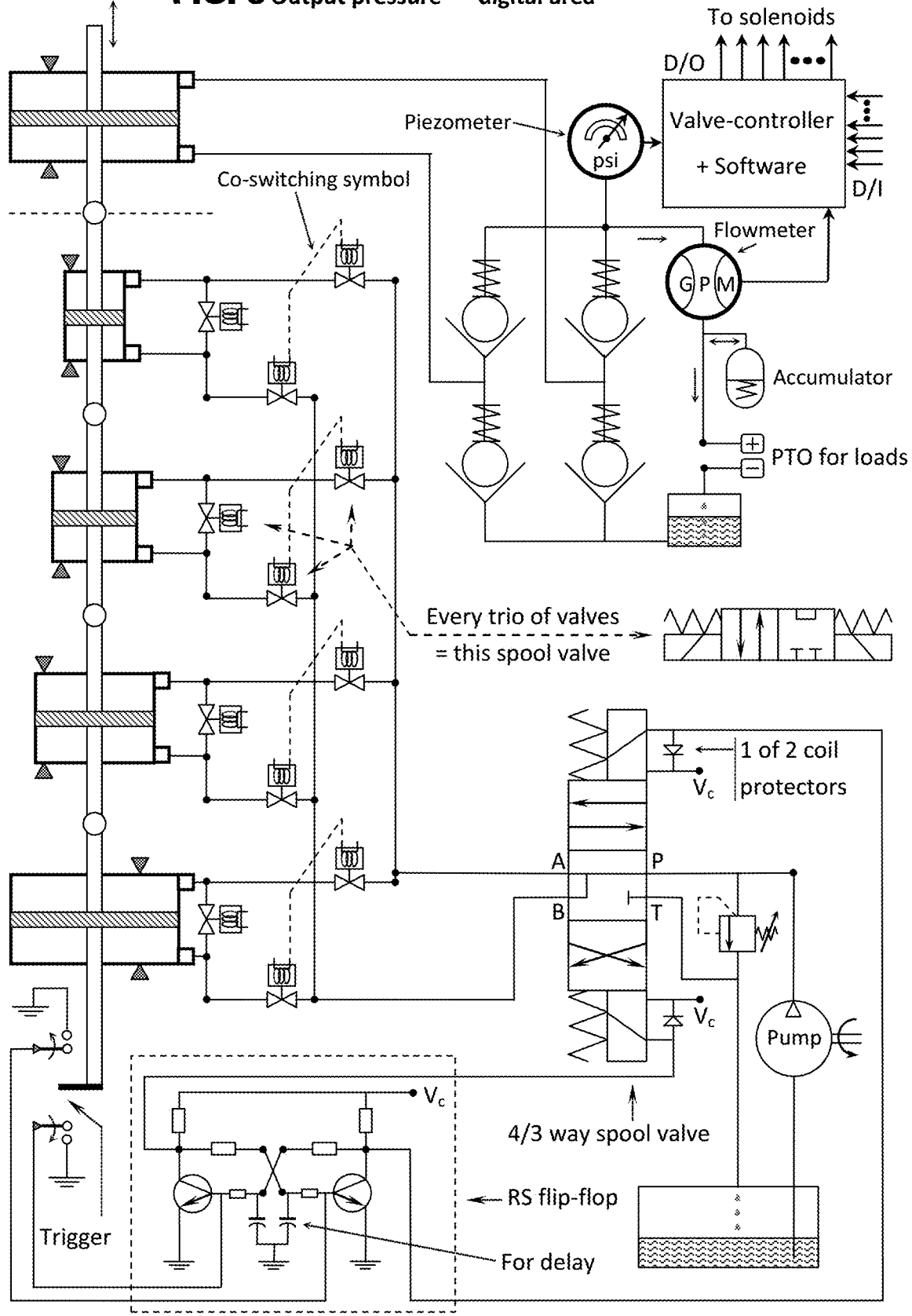
FIG. 8 Output pressure ∝ digital area

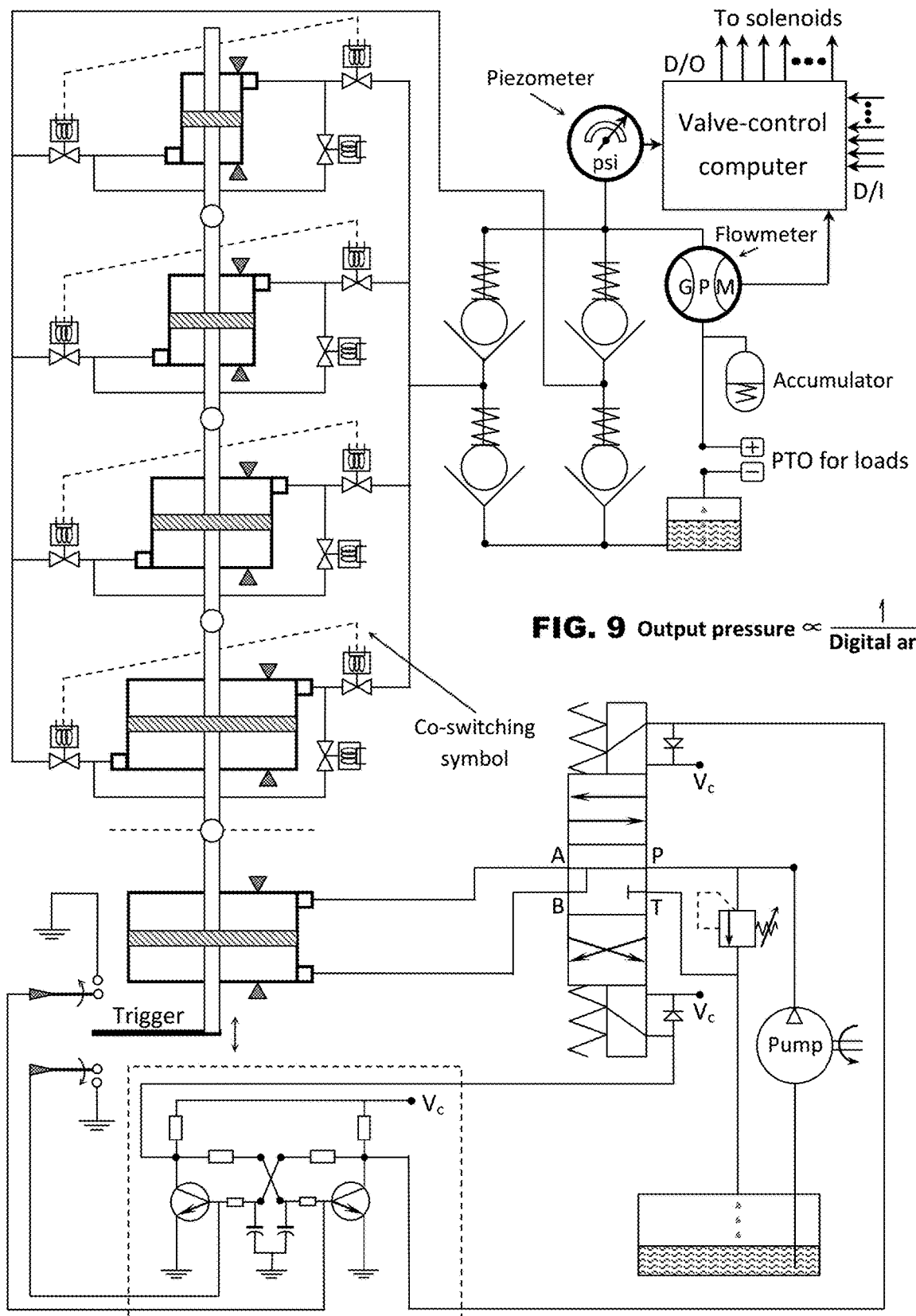
FIG. 9 Output pressure ∝ $\frac{1}{\text{Digital area}}$

FIG. 10  Some details of cylinder-based DC-AC inverter
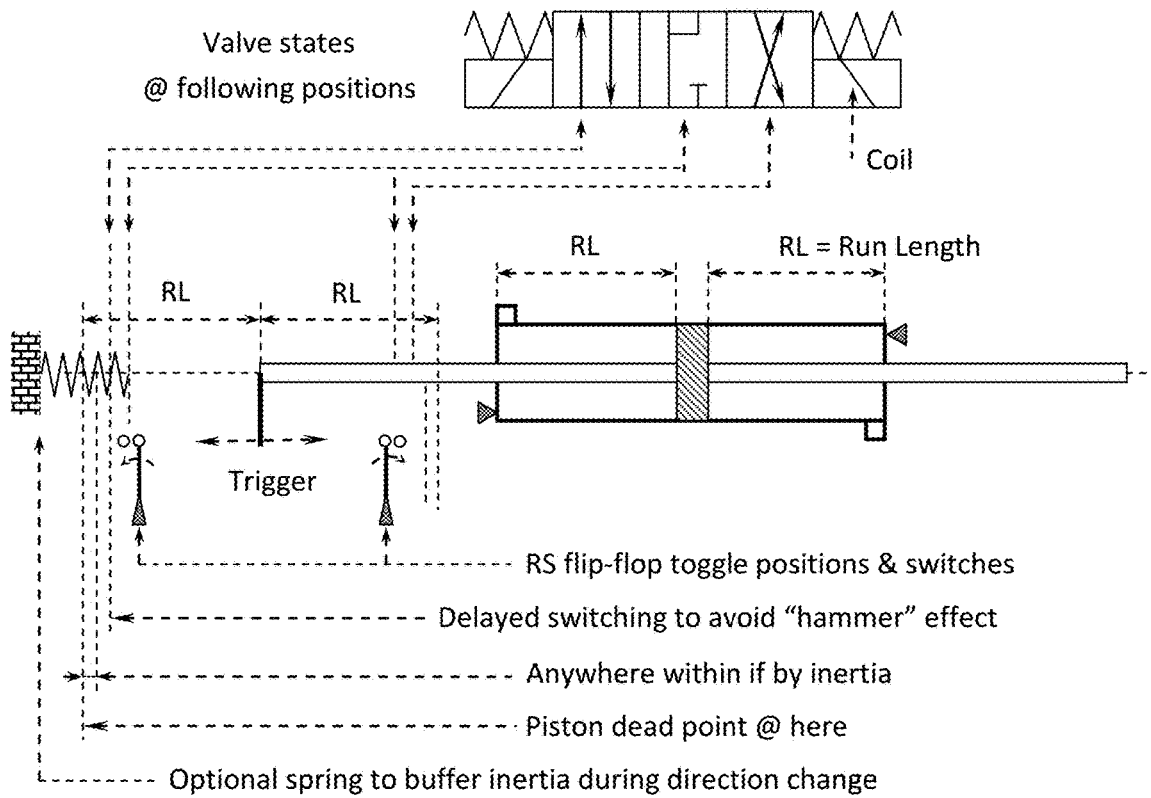
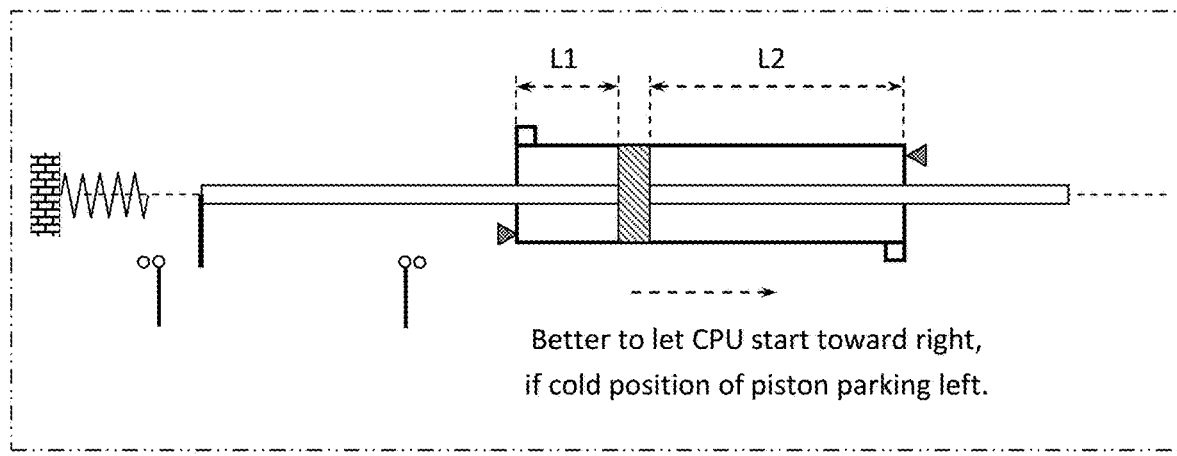

FIG. 11 Reciprocal varying frequency
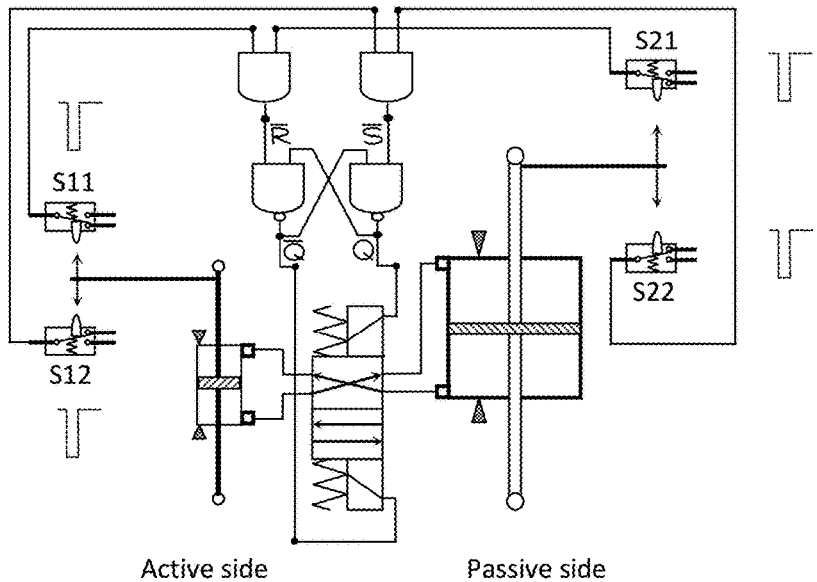
11a
Active side  Passive side
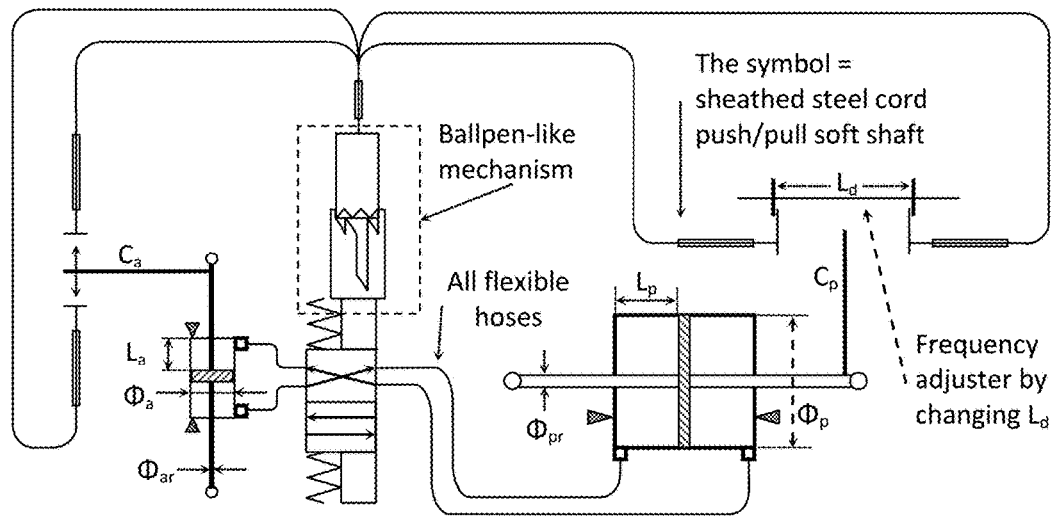
11b
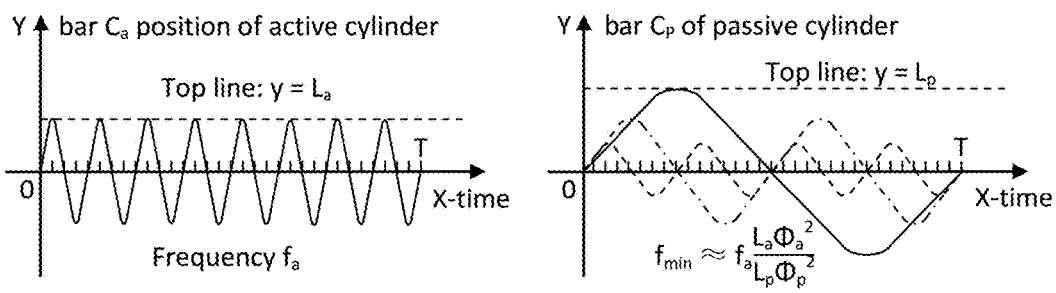
11c

FIG. 12  Hybrid of pneumatic-hydraulic to overcome slow piston
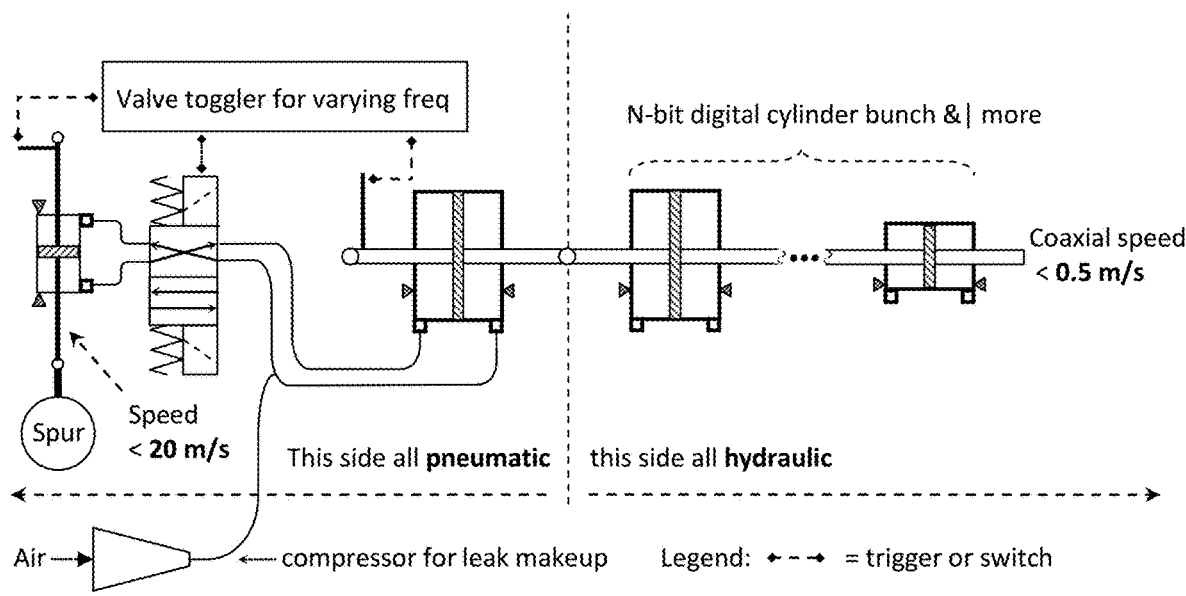
FIG. 13  4 bits A-D converter example with dials
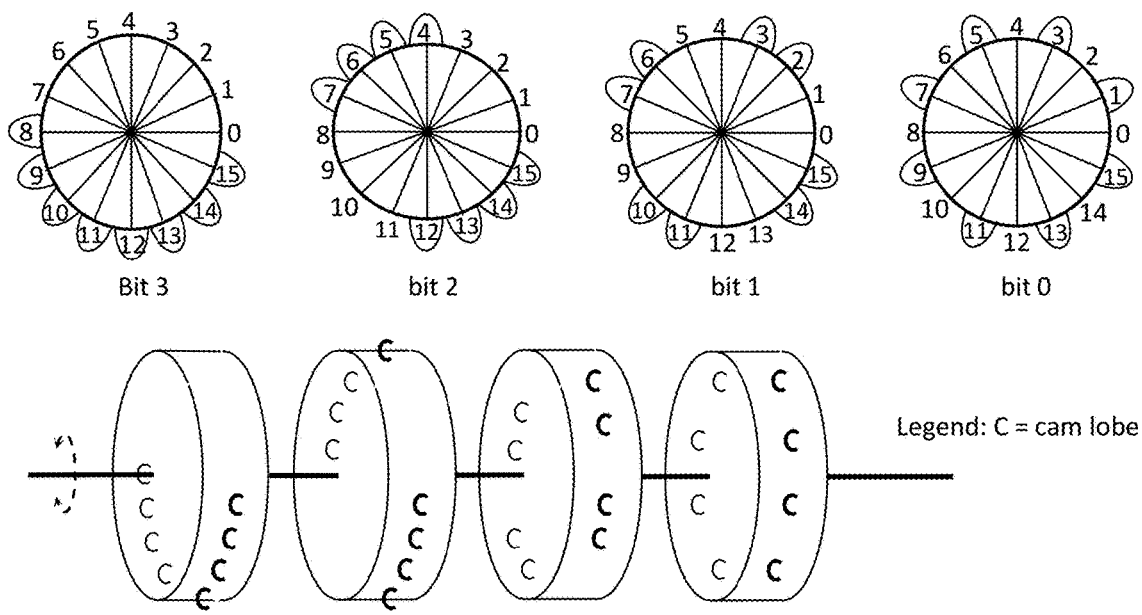

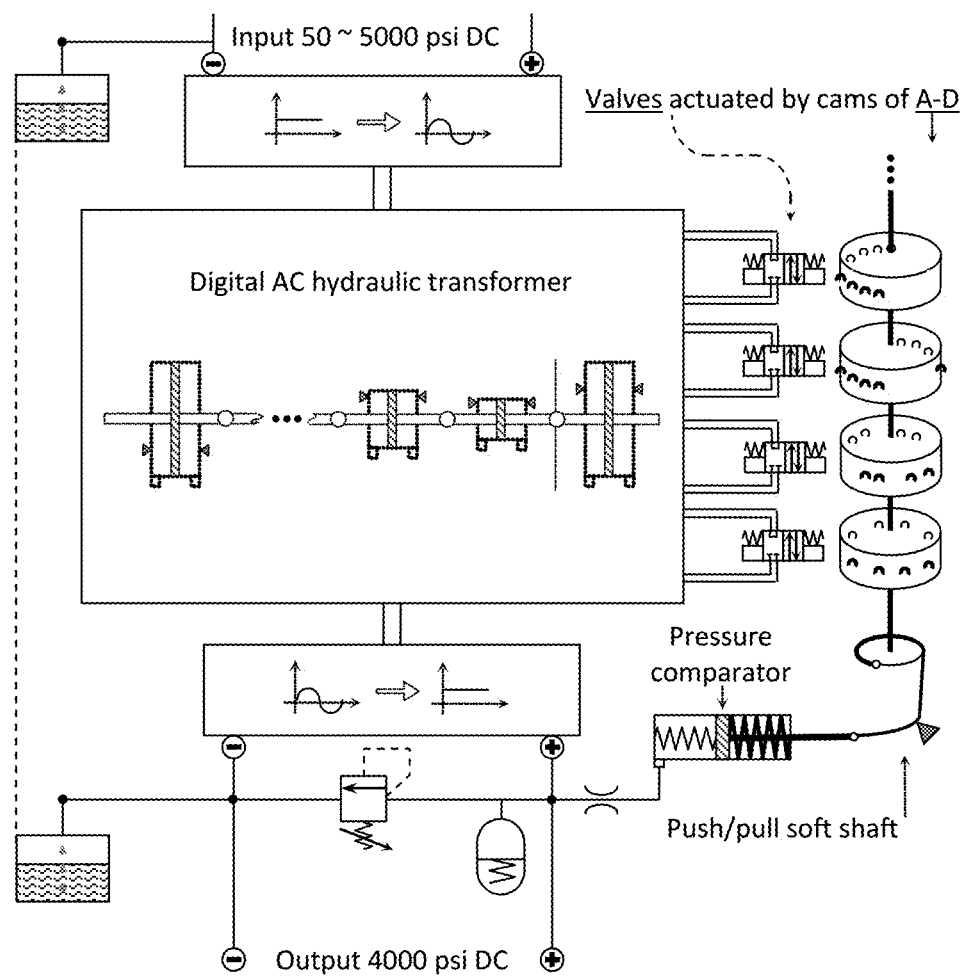
FIG. 14 Most-wanted hydraulic DC boost/buck regulated power supply

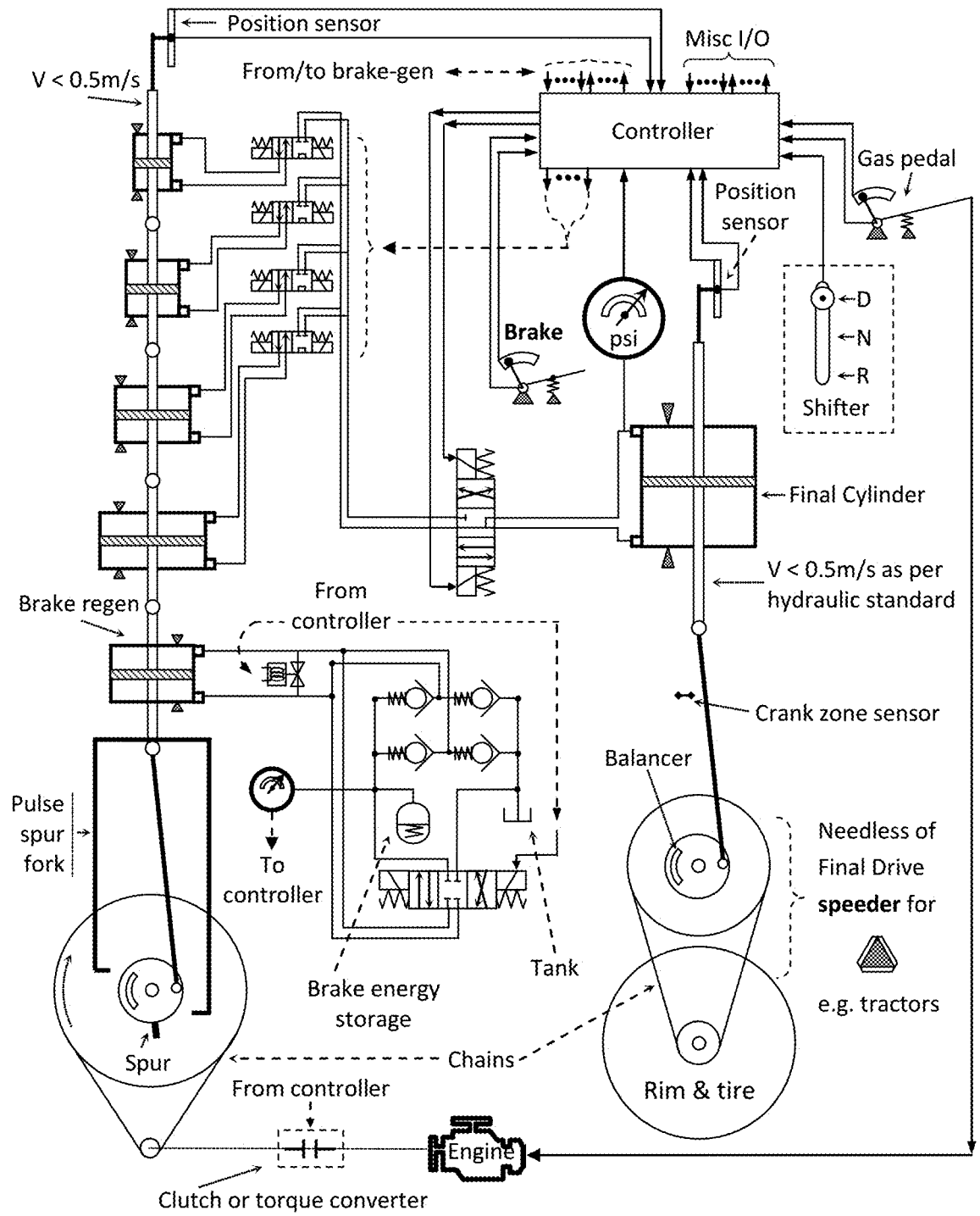
FIG. 15 Vehicle hydromechanical transmission + brake regeneration

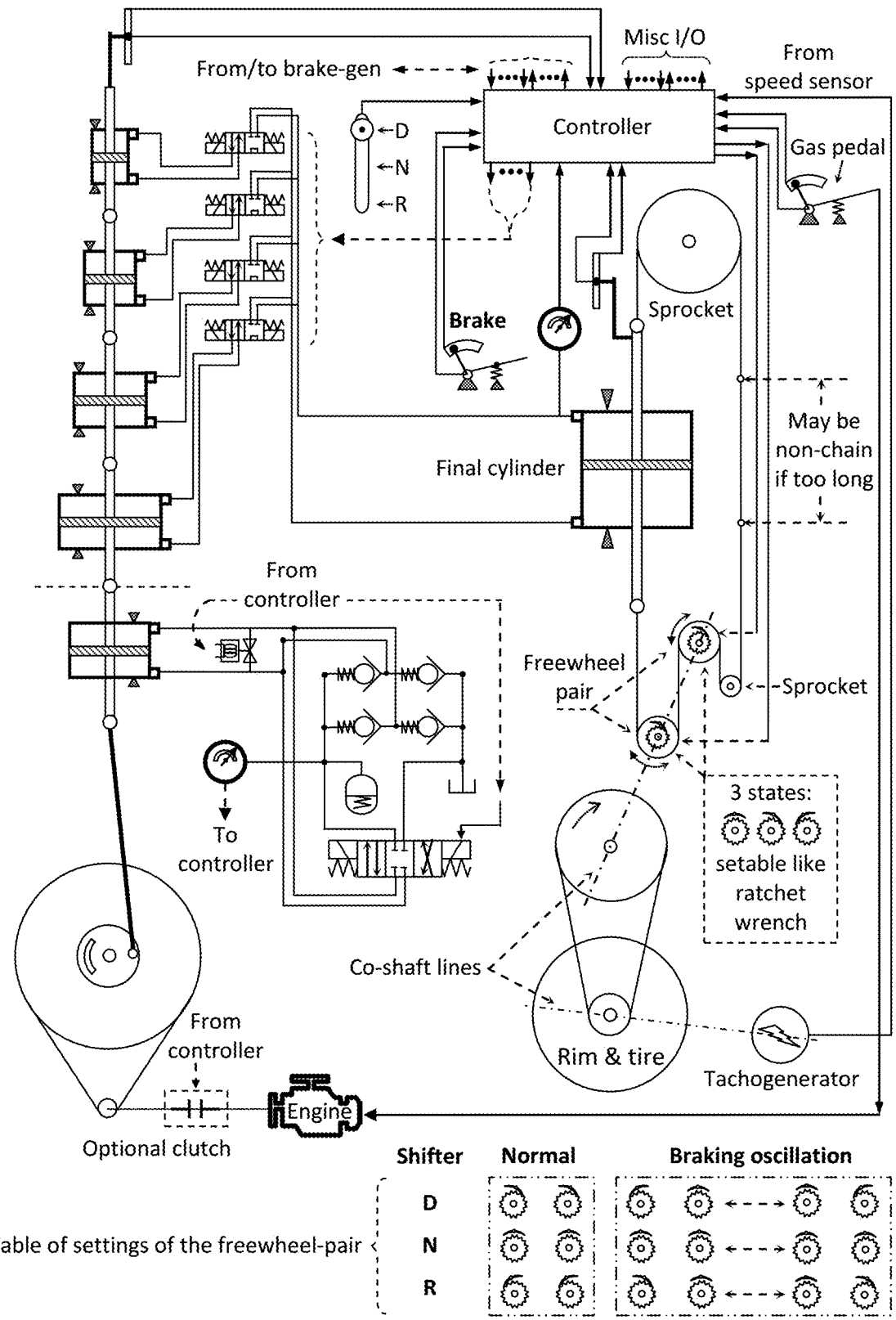
FIG. 16 New version with some modifications on previous version

DIGITAL-SWITCHING FLUIDIC POWER SUPPLY AND HYDROSTATIC TRANSMISSION WITH REGENERATIVE BRAKE

BACKGROUND AND PRIOR ARTS

As early as in 1880s, the two feuding geniuses Edison & Tesla waged a "war of currents" over which one of AC & DC electrical systems would power the world. Of course, nowadays everyone knows Tesla-advocated AC won.

In contrast, hydraulic power system is still struggling in localized applications, and only in DC form, i.e. almost all hydraulic pumps & motors work in one way direction of oil current. Thus there is no such thing of 3-phase hydraulic motor, not to mention the inexistent war of DC & AC oil current, though jealously 3-phase AC electrical motors omnipresent everywhere.

No matter electrons or oil, only AC current can be transformed from one magnitude to another one. To facilitate fluid power transmission, the concept of AC oil current must be introduced.

In a sense, a simple double-action cylinder is a good, cheap yet powerful oil-AC component, but modern industries prefer to use the extreme complicated & expensive pumps & motors, such as the type of swash plate variable displacement, in order to cope with ever-changing load conditions, because of the restrictivity of traditional oil-DC backbone.

It is possible to substitute a regular pump or motor with a regular cylinder. To get rotary motion, a regular cylinder should be combined with a special mechanism of linear-to-rotary motion, so as to rectify AC reciprocal motion to DC one way rotation. Here, cylinder rod reciprocal motion is rhetorically called as AC motion, and pump/motor unidirectional rotation as DC motion.

As a creative inventor, when to repair heavy duty machines, I sometimes tinker oil-DC to/from oil-AC system, so as to avoid of buying too expensive OEM parts, e.g. a radial piston hydraulic motor to swing excavator may cost more than $30K USD.

A cheap cylinder can easily output tens of tons thrust force, therefore same easy to get huge torque by applying the force to turn around something. The torque capacity can even be far larger than the expensive dedicated motor.

With the invention of constant high pressure hydraulic power supply system, one day, may it extend from engine-tethered application to near range or mid range distribution system, such as factory-wide, even community-wide, in partial replacement of electrical AC transmission.

Broad adaptivity does matter for efficient power system! That is why the switched-mode electric power supply replaced the linear-mode one. Nowadays a 5V output DC power supply can cheaply & widely adapt from 1.5V to 400V AC/DC input.

But there still lacks of a counterpart for those non-electric power systems. That is why once upon a time the sparkling startup company LightSailEnergy went out of business of CAES (Compressed Air Energy Storage) after 10 years harsh struggles. Sorry for my lateness to bring out this workable invention that would have saved the said company if early hello world.

Because a discharging air tank will drop pressure from 5000 psi to 0 psi, however, they have no means to harness this plummeting energy storage for stable generator output, and if the dead threshold is 4000 psi, then recharge will be too frequent even in fake "empty" status, as bad as the ideal energy density will discount 80% off, let alone the heat loss.

All energy storage systems confront same above-mentioned impasse, except the battery storage which empty voltage is just a little bit lower than full charge voltage, e.g. for lithium battery, 4.2V full voltage, and 3V empty voltage. For compressed air storage at 5000 psi, by common sense, even 100 psi is still useful and can at least power pneumatic tools.

Therefore, constant output+wide adaptivity non-electric power conversion technology is the undetourable gateway for all cleantechs.

Also vehicular powertrain loves this technology, however not as important as a gateway.

Although prior technology CVT (Continuously Variable Transmission) can solve adaptivity by an extent, however its friction loss is still a demerit of lowering somewhat efficiency, and life expectation is another concern.

Just like electric powertrain, hydraulic powertrain can inherently integrate regenerative brake. Therefore, an Internal Combustion Engine (ICE) powered vehicle can greatly benefit from my subject inventions with economic brake energy reclaim!

Currently only pure electrical or hybrid powertrain with electrical partition have regenerative brake featured models in commercial massive production, though pure fossil powertrain is still under intense research & experiment on specific vehicles, such as municipal garbage trucks.

As to current developers on air cars, their efforts to invent better pneumatic air motor, in my humble opinion, it may be on the wrong way, because no matter how excellent the air motor, commercialization of air cars may never be possible without a wide adaptive transmission plus regenerative brake plus heat miser.

Although wind power utilization is listed at the forefront of cleantech enthusiast's or politician's Green New Deal, however none of current turbines can efficiently retard the superwide speed spectrum, but only fetch partial energy from a narrow middle bandwidth thereof, especially the waste is a regret for the long time lasting weak wind energy all year round. Indeed, proper kinetics retardation cannot be just made perfunctory, but really needs the unprecedented masterpiece works like a delicate art. I was motivated to invent something by and for such sad reality.

Dare to think bigger? Currently the uncontrolled nuclear fission-fusion tandem explosion is quite mature, even North Korea knows how to play it, but controllable model is still under long time theoretical & experimental research. Hopefully subject inventions can make whatever energy source's controllability no longer so important. Therefore, even uncontrollable, once the fed tiny fusion fuel is quickly burnt out in a few of seconds and in a confined space, as long as an engineered medium can safely store most released energy, this non-ideal but acceptable trade-off system can still automatically adapt the huge attenuation of input then maintain stable output for days even months until next nuclear ignition uncontrollable cycle. Of course, I am peace loving inventor, adamantly advocate civil nuclear power application.

SUMMARY OF INVENTIONS

Invention #1 Method to Digitally Boost or Buck Fluidic Pressure

As pressure is not arithmetically summable, thus it is impossible to get high pressure by mixing low pressure different fluidic sources. However force is summable, so there can exist a game named as the tug of war.

To boost or buck pressure, hydrostatic pressure should be converted to force first, then to push a variable area for pressure change.

Continuously varying area is difficult to implement, although iris diaphragm seems to be easy such mechanism, unluckily there is no way of sealing it at a pressure.

My key invention is to use a bunch of digital discrete areas for approximate continuity.

In binary digital system, a standard byte has 8 bits (each bit 0 or 1), and can be expressed as $b_7b_6b_5b_4b_3b_2b_1b_0$, its decimal value=$2^7b_7+2^6b_6+2^6b_5+2^4b_4+2_3b_3+2_2b_2+2b_1+b_0$=$128b_7+64b_6+32b_5+16b_4+8b_3+4b_2+2b_1+b_0$ Therefore, 8 bits can have max 256 discrete values. In general, for N bits, there exist $2^n$ discrete values, the minimal value=0, and max=$2^N-1$.

A piston-drivable cylinder can instantiate the abovementioned bit with help of a fluidic switch or valve. By rod-to-rod rigid connection of those said "bit" cylinders in a line, like cylinder-train, as per the summability, the grand total force can be adjusted via those cylinder-bounded switches. So in a sense, the cylinder-train can be thought as a force adder.

Double rod-end cylinders are preferred, because such a cylinder always has equal active area for force delivery on both sides of piston-divided chambers: the piston area minus the attached rod cross section area.

If not consider factors of cost & complexity, two regular single rod-end cylinder can also make a double rod-end cylinder by butt-to-butt rigid connection and proper hoses direct connection. Here, "butt" is rhetorically referred to the rodless end of a cylinder with single rod end, and usually embodied in form of a welded steel piece with big pintle hole.

Of the cylinder-train, the slimmest cylinder represents the base bit $b_0$, its active area is referred as the least common denominator $A_0$, and other cylinders all have different active area $2^n A_0$ respectively, n=integer 1, 2, 3, etc.

In general, this inventive method may not care about the sequence of the cylinder-train, though size descending or ascending order looks aesthetical.

If any rod internal stress is close to the yield stress, then the order does matter, and cylinder's rod size should be at ascending order along pistons heavy-load motion direction, further the pistons reverse motion should limit load. Unless extreme application, this situation is not regular, because even regular steel Young's modulus is high enough, comparing with commercial hydraulic max pressure level.

With transformer primary linear adjustable total force exerting on piston of the transformee cylinder at other side, therefore secondary pressure will be changed responsively as output.

Assuming primary side: pressure $P_1$, N pieces of cylinders, decimal variable value $B_\#$ of the corresponding N bits binary number; secondary side: pressure $P_2$, piston area $A_\#$, then $P_2=P_1*B_\#*A_0/A_\#$ As $-1<B_\#<2^N$, therefore, by proper design of parameters N, $A_0$, $A_\#$, it is possible to boost (increase) or buck (decrease) output pressure.

If let secondary side, or say, not primary side change area, the output pressure is no longer linearly proportional to the area change, but inversely proportional. Such a setting may be also preferred in some applications.

As only alternating fluidic current i.e. AC fluid power can be sustainably transformed from primary side to secondary side, therefore the input should be in oscillating form, or must be converted to AC state via a so-called DC to AC fluidic inverter, if the original comes from direct fluidic current i.e. DC fluid power source, such as a regular hydraulic pump.

The frequency of oscillating fluid current is constrained by at least 3 factors: fluid type—hydraulic or pneumatic, max switching frequency of valves, and max run length of piston.

Generally speaking, the said frequency is within the scope of extreme low frequency (≪1 Hz) to infrasound band, and the lower the frequency, the longer the system life expectation. The transmission power is irrelevant or non-sensitive to the oscillation frequency.

In contrast, the oscillator in a switched-mode electric power supply, it usually works in tens to hundreds of kHz, so as to use small size inductive ferrite core and to transmit larger power.

Multiple types of fluid can teamwork for performance improvement, e.g. a pneumatic cylinder can be pre-stage or post-stage of a hydraulic cylinder for changing piston velocity or reciprocal frequency, so as to take advantages of pneumatic high piston velocity (<20 m/s) or hydraulic low piston velocity (<0.5 m/s). Obviously, it is just the analogy of Variable Frequency Drives (VFD) in electrical domain, however here is the fluidic VFD.

In fact, the aforementioned inverter or the fluidic DC to AC is just a special fluidic VFD which convert 0 Hz of one-way rotary pump to non-zero Hz of reciprocal cylinder.

Unlike the serial linked cylinder-train, a regular fluidic VFD has a pair of parallel-linked cylinders with different volumes wherein pressure is identical, and in special configuration, any side cylinder can be a logical "macro cylinder" that comprises multiple physical cylinders, e.g. the digital cylinder-train. In a time span, controlled by a direction valve & rods position sensors, if the primary cylinder runs M strokes and secondary parallel cylinder runs N strokes, then the frequency ratio is M/N, which is a characteristic parameter of fluidic VFD.

Just like an electrical transformer that can have two choices of groundings for primary & secondary sides: common grounding or isolated grounding, the hydro-transformer or fluidic current transformer can also have two choices for fluid return tank/reservoir of primary & secondary sides: to share one tank or to use separate 2 tanks at each side.

But in full AC oil circuit, tanks, if there is any one, should airtightly be full oil-loaded, and usually such inline pressurized tank is useless; only when oil circuit or its extension circuit contains oil DC partition, the tank addition can make sense of "grounding", that allows air breath. Here "grounding" has analogical meaning as in electronics there refers to zero voltage, as air-exposed oil in tank has zero relative pressure, though its absolute pressure is 1 atmosphere.

In some compact hydraulic applications, tankless may be preferred and feasible, however the oil circuit must be prefilled, air-tight and leakless so as to prevent from cavitation.

Because the fluid contents of primary & secondary sides can be different, e.g. one side is regular hydraulic oil, another side fire-resistant water-glycol solution, so in this case, if tanks equipped, two separate tanks should be deployed for each side.

This methodic invention of digital cylinder-train is the base for all other value-added inventions.

Invention #2 Constant Pressure Fluid Power Supply with Broadband Input Adaptivity With proper switching logic on the bunch of cylinders, aka cylinder-train, adjustable constant pressure power supply can be realized to adapt a very wide pressure fluctuation of fluid input.

A computer-based programmable controller is much friendly to the required regulation on a digital cylinder-train by nature, because of its great software capacity.

Not only constant pressure, but also other multiple objectives regulation is possible, such as constant current or flow rate, constant power, etc. Thanks to the CPU's flexibility and the fundamental invention of digital cylinder-train.

For low cost or simplicity, even pure hardware or mechanism can also be worked out to control a digital cylinder-train for some applications, such as constant pressure fluid power supply, where these 3 components can replace a programmable controller: a mechanic analog-digital converter, a pressure comparator, and a calibratable spring.

Ideal constant pressure renders zero ripple waves, but for any real embodiment, it is not possible. In analogy, even the best constant voltage power supply does have millivolt level ripples on output.

In feasible fluid power engineering, usually 15% fluctuation of pressure is acceptable (e.g. if ideal 5000 psi, then 5375~4625 psi be OK), 10% good enough, 5% perfect. Even a traditional low precision pressure switch has very big differential between cut-off and cut-on, e.g. a Square-D® 40/60 psi allows 33% fluctuation.

It is the number of pieces of cylinders in a digital cylinder-train that determines the pressure ripple amplitude. The more the cylinders, the smaller the ripple will be. Usually 6 or 5 pieces is good enough, however in car transmission application, even 4 pieces sounds good, because not constant pressure, but constant flow is therein preferable, though pressure fluctuation too big.

In theory, with this invention, it is possible to boost a tap water pressure up by hundreds times, though water high flow rate may be really challengeable to match low pressure for same power.

Invention #3 Hydrostatic Transmission with Regenerative Brake

A novel system of hydrostatic transmission is invented, and it features automatic quasi even real CVT (Continuously Variable Transmission) & regenerative brake, with virtue of using neither planetary gears nor variable displacement pump or motor, but using the afore introduced digital cylinder-train as its core.

Most vehicles in real world, if not all, have less than 6 shifts manual or automatic tranny, thus, even using 4 "bit" cylinders in this innovation, there are still superior 16 shifts.

Constant pressure is no longer the only pursued purpose, but better performance on multiple aspects are the main objectives of apparatus, including move-off or overtaking acceleration, cruise, efficiency & fuel economy, regenerative brake, amenity, vehicular gamut adaptability, etc. When facing multiple factors, trade-off may have to be applied.

Abstractly, this hydrostatic transmission system naturally covers the entire power-train from engine shaft to tire-wheels, though the digital cylinder-train+following final cylinder+storage accumulator+controller metaphorically constitute the substantial torso.

The frontend covers from engine shaft to the so-called torso, the backend from the torso to tire-wheels, and these two ends are supposed to adapt the different terminal speeds, so that all cylinders inside the torso ensure their reciprocal velocity in compliance with hydraulic technical standard, i.e. less than 0.5 m/s.

At frontend, engine shaft rev speed is reduced to a proper value by a simple ratio-fixed reducer, then next relay stage converts rotary motion to reciprocal motion, and entry point of the torso is reached, where the common shaft of digital cylinder-train is pushed & pulled at rev frequency of the reducer's slave wheel.

For those very low rev diesel engines, the frontend reducer may be optional, for example, big cargo ship application.

The reciprocal frequency of cylinder-train can be changed via a "bridge" of spool direction valve or other means to another reciprocal frequency of the final cylinder, and frequency ratio can be constant or be adjusted by a computer-based or PLC controller.

At backend, the final cylinder reciprocal motion is converted to rotary motion, and then next relay stage or final drive is a simple ratio-fixed speeder, which last slave wheel(s) shall be vehicular tire-wheel(s).

Depending on types of vehicles, the backend speeder can be unnecessary for those slow moving vehicles e.g. excavators, because low speed is easy attainable; or for those large tire vehicles, e.g. agricultural tractors, because simple co-shaft & iso-rev master/slave aniso-radius diwheel assembly can also amplify peripheral linear speed by limit yet acceptable multiples.

In most applications, with just mutual inverse modes, the reducer ratio is usually about 10×, so is the speeder ratio, though they may not exactly equal.

The mutual conversion between rotary motion and reciprocal motion can be implemented by the simplest crank-rod mechanism, though there are two dead points in conversion from reciprocal to rotary motion, or two weak points in conversion from rotary to reciprocal motion.

Dead points can disappear if replace the crank-rod mechanism by a pair of freewheels involved loop oscillateable mechanism, where the two freewheels co-shaft with same orientation of drivable directions, and the reciprocal motion is driven by a partial section of the loop. Usually a loop comprises some sprockets and chain or the proper combination of chain(s) & rope(s), where one or more sprocket(s) may be idlers.

Weak points can also disappear in reverse application of abovementioned dual freewheels loop mechanism, but all freewheels must have multiple states for adjustment, so that a controller can oscillate the loop by changing freewheel's preset direction from one to another or disengaged state, i.e. the neutral state.

A tandem bicycle for sport or entertainment seems kinda like the said dual freewheels system, though not exact same thing in subject inventions.

The regenerative brake sub-system shares the same cylinder-train-based transmission, just in reverse energy transfer path, which storage hydraulic accumulator is deployed at frontend, connecting via an exclusive hydraulic cylinder.

In parallel drive or time multiplexing drive with the engine, the recoverage process can release the cached energy to the cylinder-train from the accumulator, at the highest priority and at a controlled pace depending on drivers intention measurement.

With all acquired realtime data in the controller from sensors of brake pedal and gas pedal, the paces are set to control or execute the storage & recoverage progression by embedded software via proper algorithm and interfaces.

For reasonable & reliable design on parameters, max power should be correctly picked, and generally the engine nameplate power is less than the practical braking power, because circa 10 seconds is needed for regular vehicles to accelerate from standstill to full speed, but the very emergent braking action is supposed to finish within not longer than 2 seconds from full speed to standstill, and this implies the max braking power may be 5 times higher than engine.

Although jumping lanes for overtaking also needs instant big torque & power, however it is still far less than move-off, not to mention the greatest braking power, therefore robust enough to use max braking power as design reference, unless regenerative brake is not supported.

Trivial braking logics will be discussed in later sections of figure relevant descriptions, at it is too complicated to depict by only exhausting text capacity without drawings synergy. Even therein my best effort produces so lengthy detailings, a few special knowhows may be still unveiled.

Oh boy, if the complicacy of regenerative brake is not so profound, with so many Einstein-ish talents all over the world, contributing Sisyphean endeavors generation by generation, how can the later generation I have any opportunity to invent it?

Invention #4 Novel Business Model that Markets & Sells Serial Packages of Digitalized Cylinders Catering for Prosperous Kaleidoscopic Applications I believe there is an optimistic anticipation on my current series of inventions & unfathomable potential numerous utilizations of digital cylinder-trains, therefore it is golden idea that markets and sells serial packages of digitalized cylinders.

For a current hydraulic cylinder maker, the size serialization & standardization always look beautiful, but such a product-line configuration cannot satisfy the customers who are going to develop promising products or projects with digital cylinder-trains as key components, because most sizes in a cylinder-train have to accurately ensure the rigid-required value of active piston areas, so the calculated sizes are often ugly, though there may be one cylinder with sleek size.

Such bundle sales scheme can also boost productivity effect and business performance.

BRIEF DESCRIPTION UPON ALL FIGURES

There are total 16 drawings:

FIG. 1 illustrates the analogy between a typical switched-mode DC-DC converter on left side and its counterpart DC-DC hydraulic version on right side;

FIG. 2 illustrates the most commonly used parts in my inventions and its makeshift if not available in market—the double rod-end cylinder;

FIG. 3 illustrates the digital hydraulic AC linear transfer, aka digital cylinder-train;

FIG. 8 illustrates a hydraulic power supply system with an embedded 4 bits cylinder-train & a computer-based controller, featuring: the output pressure is linear with digital-adjustable piston area;

FIG. 9 illustrates a minor modified version of FIG. 8, featuring: the output pressure is inversely proportional to the variable piston area of cylinder-train;

FIG. 10 illustrates some details of a cylinder-based DC-AC fluidic inverter;

FIG. 11 illustrates how to vary the reciprocal frequency by two methods, also shows waveforms, and contains three relevant subfigures;

FIG. 12 illustrates how to overcome slow piston by hybrid of pneumatic and hydraulic components;

FIG. 13 illustrates schema of 4 bits analog to digital converter example, implemented by a pure mechanical A-D converter;

FIG. 14 illustrates the most wanted hydraulic DC boost/buck power supply;

FIG. 15 illustrates a novel vehicle hydromechanical transmission with regenerative brake;

FIG. 16 illustrates a modification, based on FIG. 15.

DETAIL DESCRIPTIONS UPON ALL FIGURES

Figure 4:
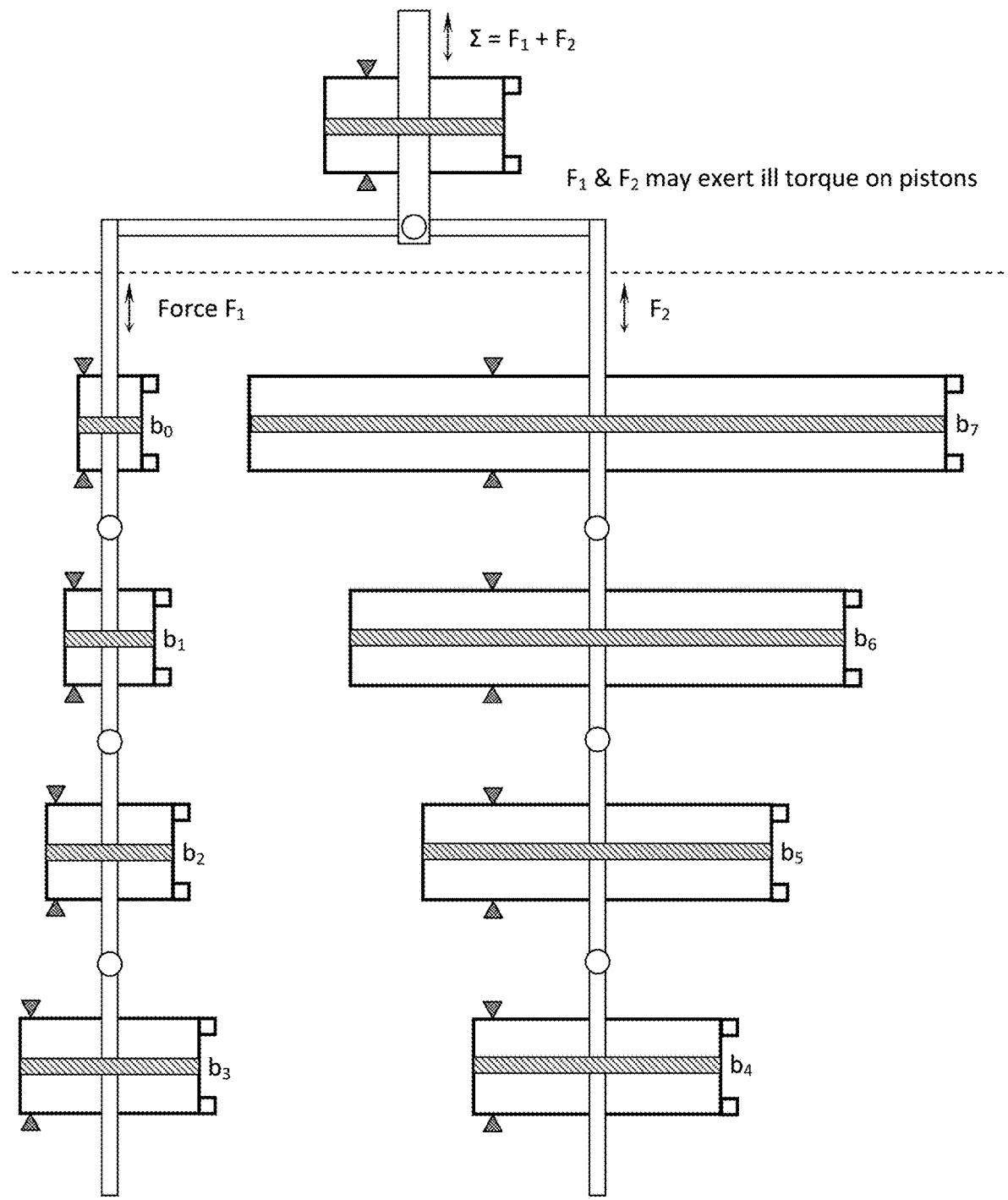
FIG. 4 illustrates an alternative layout of FIG. 3.

FIG. 1 illustrates the analogy between a typical switched-mode DC-DC converter on left side and its counterpart DC-DC hydraulic version on right side, though this version is not claimed as my subject invention, just for spicy comparison and hors d'oeuvre of digesting all inventions.

By analogy, a hydraulic accumulator is equivalent to an electrical capacitor; a simple hose or coiled hose, aka "hydrodynamic inductor" to an electrical inductor; a hydraulic valve to a transistor switch; a check valve to a diode. For DC-DC conversion, a frontend oscillator & a backend rectifier are always needed.

It is the employment of inductors that makes voltage boost or buck possible, because sudden cutoff of current can induce very high voltage.

Supposedly, "hydrodynamic inductor" could also be an intuitive choice, because sudden stoppage of any fluidic flow will similarly result in so-called "water hammer" effect which momentary pressure may be high enough to damage steel pipes or valves.

But this analogy technology is still not yet mature for massive commercial applications, because of many engineering hurdles, such as noise, vibration, dimension limit, etc. though many hydraulic ram pumps do already exist in real world, however they need special landscape with grand hillsides to boost low water-head for higher pressure.

This figure may inspire all peer researchers. Wish someday this hydrodynamic hydraulic analogy version can be made compact and successful to full potential in the future.

Anyway, switched-mode power supply is a great invention in human civilization; it saved huge resources of silicon steel; high efficiency made Earth greener; light weight promoted mobile or portable applications. Confidently its hydraulic counterpart will also do good to the world!

FIG. 2 illustrates the most commonly used parts in my inventions and its makeshift if not available in market—the double rod-end cylinder. The upper portion shows the formal product with symmetrical rods setting and two oil ports for double-action actuation.

This kind of cylinders is less demanded in current market, comparing with another commonly available regular kind—the single rod-end double-action cylinders. Because of this fact, as a makeshift, two of the latter cylinders can be used to mimic the former one by butt-to-butt welding or pintle connection.

The middle portion of this figure shows how to work out a makeshift. The two can be welded together at their butt ends, and a rigid frame can be welded with their rods near the ends. The dashed line stands for the one possible shortcut connection hose via a pair of oil ports which underlying chambers can be either dry or wet with prefilled oil. Another pair of oil ports then can be used for double-action. These two pairs of ports can swap their roles as alternative possible makeshift, though not drawn. This equivalent mimic renders same symmetry with the upper portion one.

The lower portion shows an unfavorable makeshift that only uses one regular cylinder plus same welded rigid frame. This is obviously not symmetrical though with 2 rod-ends, because the left acting area is less than the right one, as no inner rod near the butt.

FIG. 3 illustrates the digital hydraulic AC linear transfer, aka digital cylinder-train.

There is a long dashed line, and it separates the figure into two portions—the upper small portion is the secondary side with only one cylinder for output; the lower dominantly large portion is the primary side, and exhibits the standard one byte cylinder-train, which shall be the subject focus of all derivative inventions.

Digitally the 1 byte can be expressed as $B_\# = b_7 b_6 b_5 b_4 b_3 b_2 b_1 b_0$, and it can either stands for a variable value depending on each individual bit's binary logic boolean value, $B_\# < 256$; or it can imply 8 cylinders bunch & their states that will be determined by those undrawn valves fed by same AC pressure $P_1$ inflow fluid.

All cylinders are better in same length, as while in team-working, they will reciprocate in same pace with same stroke length. In fact, the max stroke length=cylinder length−2×thickness of end cap−thickness of piston.

In other words, mathematically if $b_i$=TRUE or 1, i=0~7, then physically the corresponding cylinder is connected via 2 hoses to primary hydraulic circuit.

Each cylinder's piston area $A_i = 2A_{i-1}$, i=0~7, such a simple digital adder, its total acting piston area is $B_\# * A_0$. For example, if all valves are set to logic 1 or in open state, then $B_\# = 255$, and the valid acting area=255 $A_0$, thrust force=255 $A_0 P_1$, here $A_0$=area of the $b_0$ corresponding cylinder's piston, which is also called as minimal piston area.

Manufacturers love the size serialization and standardization, so as to save management cost, as well as to guide markets. For example, cylinder makers can supply 1" 2" 3" ... bore sizes with beautiful number, but never any random ugly number, such as 126.37 mm, unless users place a much expensive backorder to customize whatever special sizes they want.

With birth of this invention of digital cylinder-train, those interested manufacturers should develop new production lines, which products will only be sold by whole sets, but not by pieces. Big buyers, vehicle or transmission markers can build OEM partnership with cylinder markers.

The $A_\#$ is piston area of secondary side cylinder, so output pressure $P_2 = P_1 * B_\# * A_0 / A_\#$ is the corollary of fluid mechanics. Cylinders not in cylinder-train should pick regular beautiful size.

Only one of 8 joints is marked by annotation in the co-axis rods relay. All joints may be simply pinned together in good order, though sequence may not be important.

All solid triangle symbols schematically stand for immovable rigid supporting points, may not reflect exact positions, and their embodiments can be any feasible fastening fixture. For convenience, the connotation of such drawing element will extend to all else figures.

As to the working fluid(s), the fluid inside primary circuit may differ or be isolated from the fluid inside secondary circuit, though the tank(s) undrawn in this figure.

At the left bottom corner, there is a sketch in simulation to a traditional electric AC transformer which principle in abstract sense is identical to the cylinder-train pressure transformer.

The D/A aka digital to analog converter provides a value to the stepper motor, that then accordingly adjust the moveable electrical contact, so as let AC input "pump" electrons through a proper number of primary coil's windings, and the proper number is just proportional to the corresponding decimal value of the given binary number.

FIG. 4 illustrates an alternative layout of previous figure. It suggests that the cylinder-train can be also deployed as a matrix of cylinders, which quantities of rows and columns can be arbitrary, yet with two provisions: invariable for the total count of cylinders; as small as possible for the dynamic torque imbalance exerting on the joint point between primary side & secondary side.

The forces are still addable, no matter how the cylinder-matrix is deployed. In this figure with drawn 2 columns of cylinders, the sum of forces on output cylinder $\Sigma = F_1 + F_2$. Of course, the undrawn flow direction valves should make sure all cylinders to render same directional forces.

As the left 4 cylinders have smaller size than the right 4 cylinders, so that is why the left arm should be longer than the right arm, because $F_1$ & $F_2$ may exert ill torque on pistons, then the torque should be roughly balanced, despite exact balance is impossible while it is working in a dynamic host energy conversion system.

Figure 5:
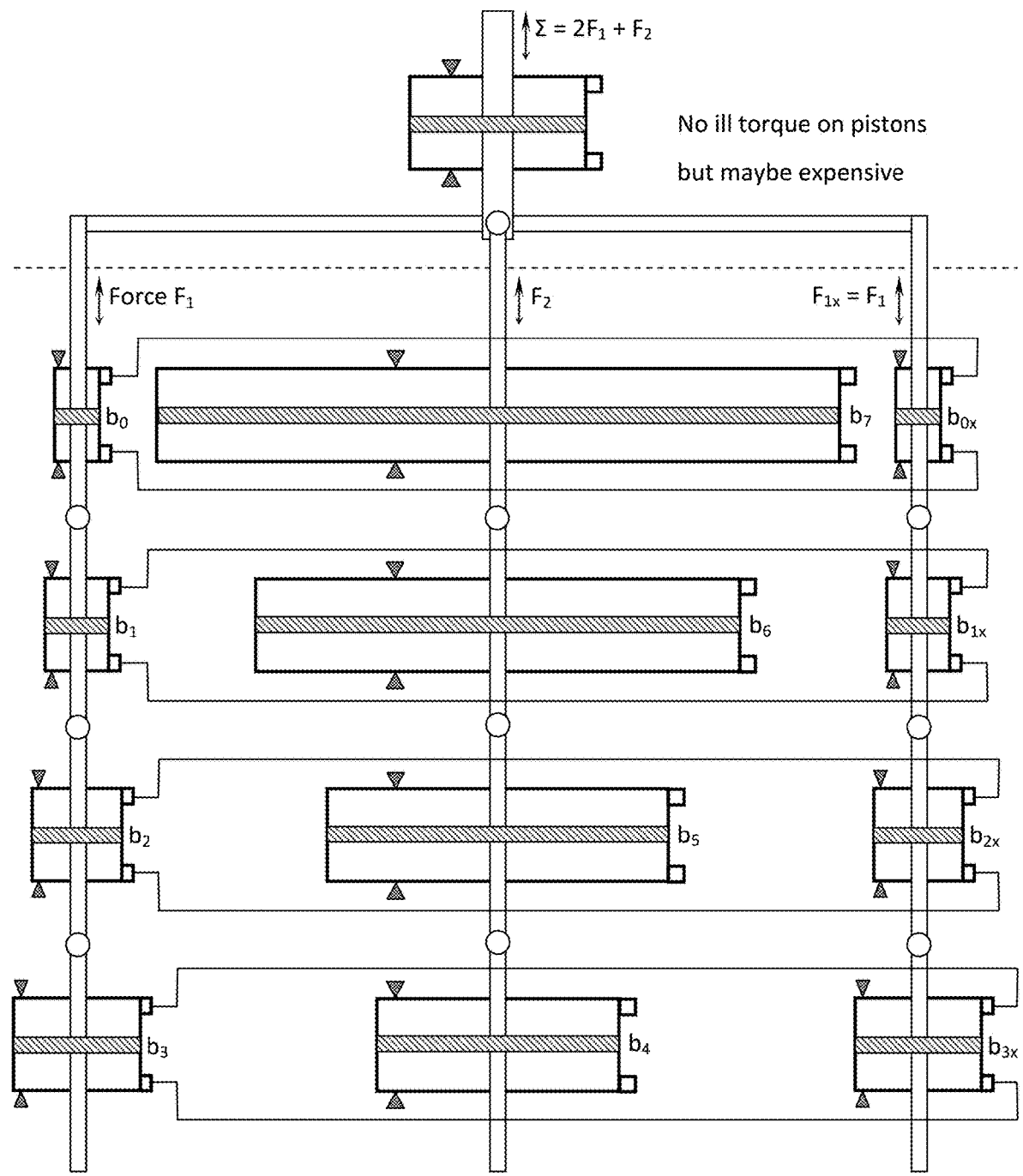
FIG. 5 illustrates an improvement on cylinder-matrix deployment.

FIG. 5 illustrates an improvement on cylinder-matrix deployment, so as to zero the uncertain ill torque exerting on the output cylinder's piston, though this solution may be expensive.

Everyone of the smaller 4 cylinders are "cleaved" to two halves, and symmetrically deploy them on two sides of the central axis of output cylinder, also with their respective oil ports hose-connected together as shown in the figure, and under synchronous control from same set of bit signals. Now, all ill torques are exactly cancelled, no matter with whatever runtime set of valves states, and all those smaller twin cylinders are getting further smaller. For instance, before performance improvement, the piston area of $b_3$ cylinder is 50% of the $b_4$ cylinder; after improvement, is 25%, but becomes $b_3$ and $b_{3x}$ twin cylinders.

The larger 4 cylinders are co-shafted with the output cylinder. Although the lower 4 bits and higher 4 bits can swap positions of their corresponding cylinders, then cleave the higher bits to 4 larger pairs of cylinders with flank symmetric distribution, however this alternative balance solution may be not a good idea, because of disadvantage in stability & cost.

Figure 6:
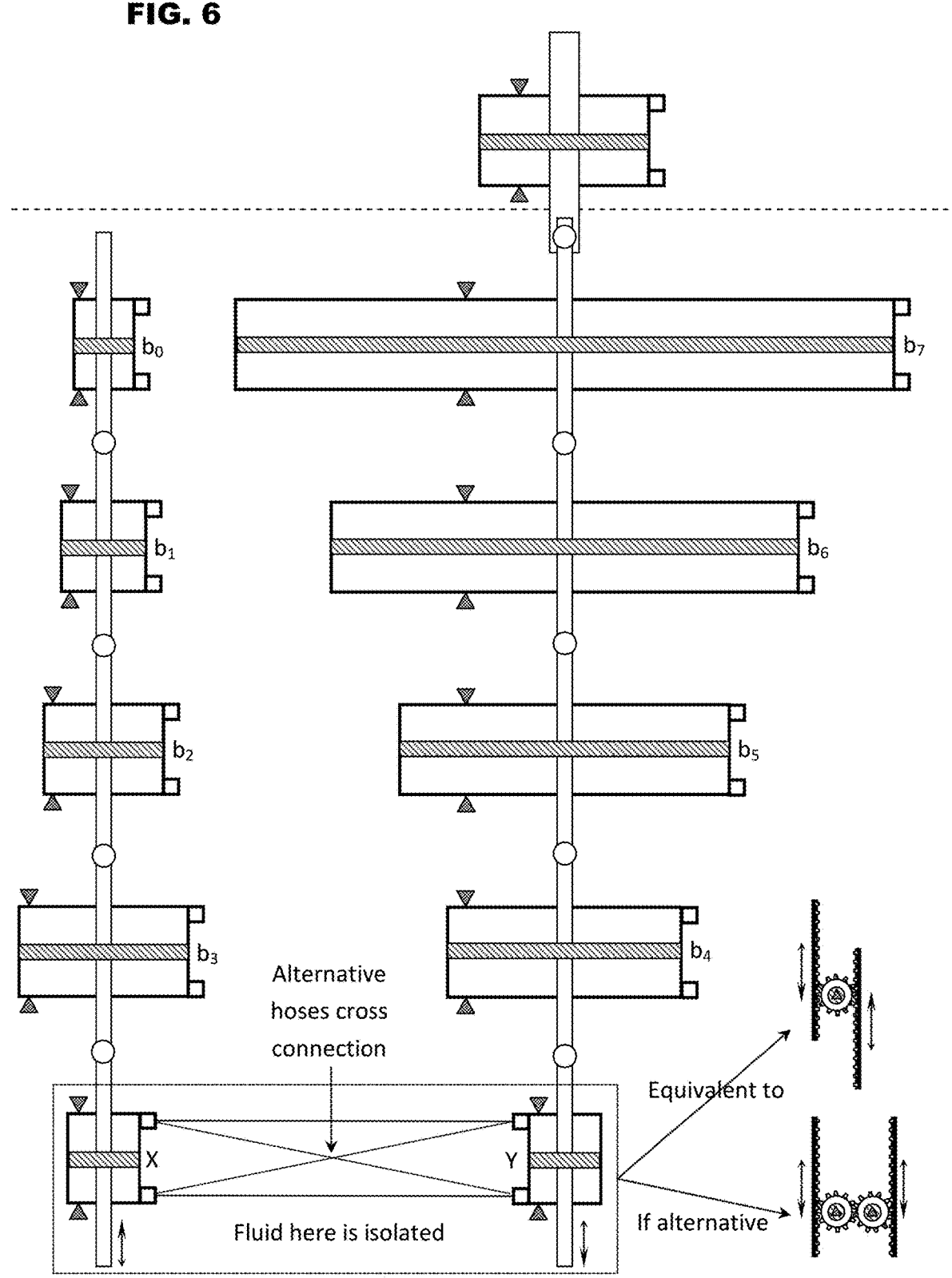
FIG. 6 illustrates another deployment of cylinder-train with more flexible space occupancy.

FIG. 6 illustrates another deployment of cylinder-train with more flexible space occupancy.

Although rated as one byte or 8 bits cylinder-train, this layout does have 10 cylinders, and of which, 2 identical cylinders are used for coupling only, with 2 hoses connected and autonomous isolated loop oil prefilled. The 2 coupling cylinders enable the smaller 4 cylinders group free of any position restraints, i.e. the partial cylinder-train can be deployed anywhere any direction, provided can the 2 hoses of coupling cylinders serve a good connect.

The partial cylinder-train can have other "bit length" or say pieces of cylinders, anyway, all "bits", either local remaining cylinders or remote partial cylinder-train must be served by the same source of fluid power, and the former is supposed to co-shaft with the output cylinder.

The half or 1 of the 2 coupling cylinders always co-shafts with the partial cylinder-train or say detached partials, as while, another half always with the local remaining cylinders or say main body. The two halves can be connected via hoses in either parallel or cross mode.

If shaft of detached partials and shaft of main body are in parallel, and if the hoses connection in parallel mode, then the two shafts will always move in mutual-counter direction, just as one pinion meshed with flanked 2 parallel racks; else if in cross mode, then like two meshed pinions with flanked 2 parallel racks, and such 2 kinds of equivalence are illustrated on the right bottom corner of the figure, whereabouts the 2 coupling cylinders are labeled as X Y, and enough annotations make it easy to understand.

In all figures, if a dotted line has 2 different size arrows, there must be another same style line nearby to form a pair of indicative lines; and if line 1's object moves toward its big arrow direction, then line 2's object must also move toward its big arrow direction, vice versa.

Figure 7:
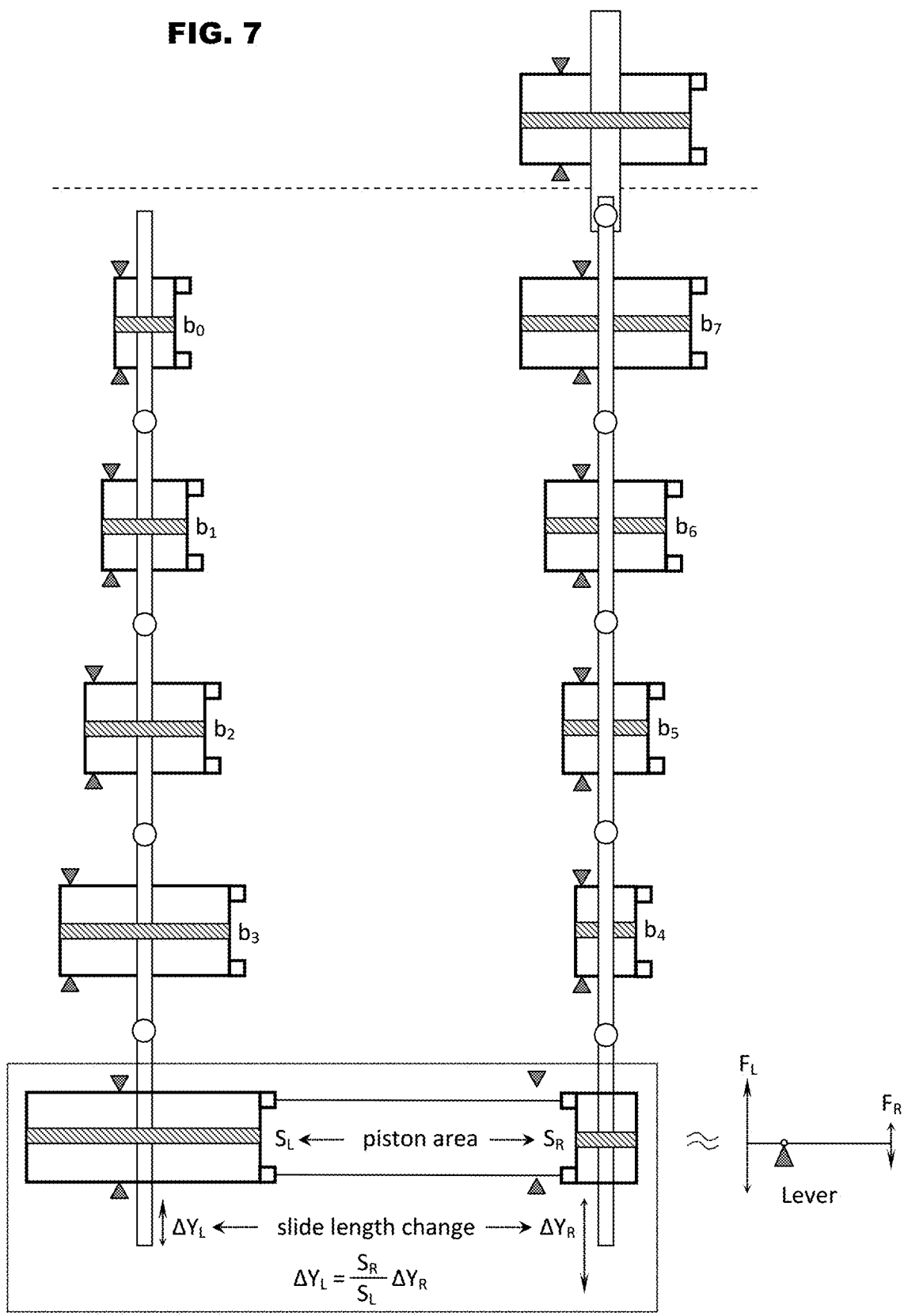
FIG. 7 illustrates a minor modification, based on FIG. 6.

FIG. 7 illustrates a minor modification on previous figure, so as to make space usage more compact, even significantly save system cost.

As the aforementioned 2 coupling cylinders are identical, thus, the transmissible force is unchanged across the main body and detached partials, so they are allelo followers.

Now, the new hydraulic coupling mechanism uses 2 different size cylinders, thus, it functions like a lever, and can collectively inflate or deflate force from one side to other side. The leverage ratio can be calculated from the ratio of 2 cylinders areas.

The two shafts will move in different velocities, their linear displacement changes meet this formula: $\Delta Y_L = \Delta Y_R (S_R/S_L)$, as annotated in the figure, here $\Delta Y_L$ is the left slide length change, $\Delta Y_R$ the right one, $S_R$ right piston area of half of the coupling cylinders, $S_L$ left one.

If the leverage ratio is 16, then 2 identical sets of 4 bit cylinder-train can build a set of 8 bit cylinder-train, and the ratio of max to minimal piston area is just 8 times; otherwise if without this hydraulic leverage coupling, then the ratio will be 128 times.

As the diameter ratio is roughly the square root of area ratio, so the area ratio 128 does mean circa $\sqrt{128}=11$ times diameters ratio. By contrast to $\sqrt{8}=2.8$ times diameter ratio of area ratio 8 in this modification, space usage will greatly reduce, as well as manufacture cost reduces.

On the right bottom corner of this figure, the equivalence is further illustrated by an embedded force diagram of lever, where $F_L$ stands for total fore of left cylinders branch, and $F_R$ stands for the left-transmitted force that is contributing to the right main branch.

FIG. 8 illustrates a hydraulic power supply system with an embedded 4 bits cylinder-train & a computer-based controller. The output pressure is linear with digital-adjustable piston area.

Every bit of the cylinder-train is associated with a trio of EMVs (ElectroMagnetic Valves). If the EMV that shortcuts the oil ports is actuated, then the subject bit responding cylinder renders idle or as a non-contributor in the collective primary force; else if ports pair not shortcut and the other 2 EMVs are simultaneously actuated, then the cylinder is an active force contributor. The simultaneity is marked as annotation "co-switching symbol" near the dashed Π shape.

Depending on convenience or cost, the trio of valves can also be replaced by a single standard spool valve, as exemplarily shown & pointed by the dotted line arrow along with annotation "Every trio of valves=this spool valve" in the right middle subview of the current figure, the equivalent hydraulic direction valve of 4-port 2-state (aka 4-way 2-position or 4/2-way) with one or two ends solenoid(s), which one state is to enable 2 oil passages, and another state is to shortcut 2 ports meanwhile to stop rest 2 ports.

The controller takes all valves of cylinder-train under realtime logic management, according to the software instructions. If necessary, it can also output driving signals to other peripheral auxiliary devices or interfaces.

Switching bits of cylinder-train is the principal task of controller. Of course, it is the application purpose that determines how to task it, and controller shall acquire all necessary data from peripheral sensors for proper control logics.

Practically, the cylinder-train runtime valid total piston area is adjusted by bit-masking switches vector of the control byte(s) of valve assemblies array, and the byte length equals 1 plus the integer part of quotient of cylinders pieces divided by 8. For example of herein 4 cylinders in the cylinder-train, one byte control signal is enough; if 10 cylinders, then 2 bytes will be needed.

As a valve-assembly can be embodied by either a trio of single channel EMVs, or a piece of 4/2-way spool valve, so the driving interface shall depend on the choice, and seemingly the driver electronic circuit for trio-style choice is a little bit troublesome than the one for spool valve.

The area variable cylinder-train is served by a regular hydraulic pump. Of course, all market convenient pumps are the class of DC, or say one way rotation and one direction flow. In order to drive AC hydraulic flow transformer, there must be an oscillator to invert DC to AC.

A hydraulic oscillator can be either pure mechanism or electro-assisted mechanism, though the figure shows the latter one, where an exemplary simple RS flip-flop transistors circuit cropped in the dotted line loop in the left bottom corner subview, it controls a 4/3-way direction electromagnetic valve for proper reciprocal oscillation, with help of two position micro switches deployed near the transformer shaft.

The said & shown two switches about left bottom corner of the figure, do limit the allowable range of shaft reciprocal motion, and the trigger installed on shaft can actuate any switch while in touch or even in close if it is of the type reed proximity switch, so as to let the RS flip-flop change state of spool valve for opposite direction flow.

The span of two switches should be shorter than the rated stroke length of cylinder-train. To minimize ill impact on end caps, the optimistic span of switches should make sure the kinetic inertia energy mostly exhausted before any end cap is touched with piston.

While the spool valve is switching to neutral state, the cylinder-train shall wait some time for exhaustion of inertia prior to shaft return, thus the RS flip-flop should reserve reasonable delay for further switching to opposite flow. This special need is met by minor modification to the conventional RS flip-flop: two proper capacitors are added to the bases of transistors via respective resistances, as annotated "For delay" in the figure.

Solenoids of electromagnetic valves are prone to induce extreme high voltage at the de-energizing moment, and even this phenomenon can damage the electrical insulation of coils enameled copper wires, that is why protection diodes are necessary in places, as shown. Such protection is also needed for all solenoidal members of valve-assemblies array of cylinder-train, though respective details are not explicitly drawn and valves thereof are not switched as frequent as the ones in DC-AC oscillator hereof.

To prevent from pump over-pressure burst, or the pressure spikes while valves switching, an overflow valve is better to connect the pump in parallel. Abstractly, an overflow valve is analogous to an electric Zener diode.

On output side, for conversion of AC to DC, a set of 4 check valves are used as full-wave bridge rectification, and also is a hydraulic accumulator attached for smoothing pressure ripple.

A piezometer or say pressure meter plus a flow meter are installed, and they can transmit realtime data to a computer-based or PLC controller, so as to regulate objective parameter, such as for purpose of constant pressure.

Not only the said two meters, as per necessity, but also other data can be acquired by the controller with proper sensors, such as oil temperature, load rev etc.

With the great flexibility, such a system can be firstly implemented to form a basic version, e.g. this 4 bits cylinder-train, some later day, it is feasible to add extra 4 cylinders & valves to the old cylinder-train even without software update if original quality software supports plug & play.

For less unwanted impact, the timing to switch bits of cylinder-train is very important. Too realtime is not necessary, and controller should catch the sharp transient standstill moments while the common shaft is going to change direction, because pressure is zero or near zero at all those moments.

By analogy, the same common practice is also applied in electrical industry. For example, if a circuit contains thyristors, the voltage cross-zero moments are preferred to switch them.

It is also feasible to eliminate the RS flip-flop, and instead let the controller directly turn on/off the direction valve between pump and cylinder-train, as while with additional data acquisition of the cylinder rod position sensor.

The hydraulic Power-Take-Off (PTO) interface can be one or more pair(s) of quick coupling female receptacles, as symbolically shown & annotated with "PTO for loads" in the figure. Any outside load can plug in via its hoses with male fitting heads.

One day, if AC hydraulic is more welcome than DC hydraulic as remote power transmission backbone, then hurry rectification may be redundant or not necessary, and then AC hydraulic can be directly plumbed to the PTO plugs.

FIG. 9 illustrates a minor modified version on previous figure. It features that the output pressure is inversely proportional to the variable piston area of cylinder-train.

Because almost all elements in this figure are identical to those in previous version, thus repetition of old description is not necessary. The only modification is to swap primary side and secondary side of the same fluidic transformer, so as the area variable cylinder-train functions as output unit, and this swap will result in hyperbolic nonlinear response of output pressure.

To beautify this figure, some drawing elements have changed positions, for example, all pairs of cylinders' oil ports are drawn by same right side in previous figure, but figure hereof, all pairs' dual ports are separately dawn across both sides. Anyway, just for drawing convenience or beautification, there is no any special implication or stipulation for really applied cylinders.

Again in this figure, the duet in a trio of EMVs is annotated with "co-switching symbol", and it applies to all other similarly dashed Π-shape drawing symbols.

The software in controller should be revised to accord this nonlinear relationship, and anyway it is an easy revision, but may be difficult for a non-computer-based controller.

In fact, reciprocation is the very original pistons motion of all ICEs (Internal Combustion Engine), however inside any ICE, this AC motion is converted to DC one way rotary motion, by rocker arms & crank shaft mechanical rectifier, because humankind believes that only rotary motion is the most useful & universal.

If using a special ICE with only reciprocal motion, then the pump & related DC-AC oscillator can be eliminated, and directly hitch the ICE' reciprocal shaft to the cylinder-train shaft.

FIG. 10 illustrates some details of a cylinder-based DC-AC fluidic inverter.

This figure can further zoomin those untold details all about the pump-adapting-cylinder oscillator mentioned in the previous figure, such as dimensional information, all states of the spool valve, transient rod positions in accordance with valve states, locations of switches for rod range limitation, and starting preference of temporal-spatial orientation.

Following information are well annotated: max possible run length RL, trigger, RS flip-flop toggle positions & switches, delayed switching moment to avoid "hammer" effect, inertia drift range, piston dead points, and optional springs to buffer inertia during direction change.

A spool valve can be actuated electromagnetically or mechanically, even an electromagnetic valve can also be actuated mechanically if its touchable plunger protrudes out. By default, if an inconspicuous slash line is seen on plunger outer end of spool valve symbol, as shown about the top right corner of the figure, therein "Coil" annotated, it implies an electromagnetic valve.

The lower portion of the figure displays a dash outlined box that contains the internal snapshot of cylinder at a random moment. If the controller detects this static parking state at starting time, it is better to let CPU firstly drive the cylinder toward right, because the partial stroke $L_2$ toward right is larger than $L_1$ toward left, otherwise if not so, too quick to change direction.

Anyway, above starting tactics may be trivial, so just regard it as a good preference of controller's software.

FIG. 11 illustrates how to vary the reciprocal frequency by two methods, also shows waveforms, and contains three relevant subfigures.

Subfigure FIG. 11a shows an electrohydraulic VFD (Variable Frequency Drive) version, comprising a small cylinder in active side, a large cylinder in passive side, two pairs of cylinder-associated switches S11/S12/S21/S22 for rods range limitation, electromagnetic direction valve, RS flip-flop, and a pair of logic AND-gates.

The small cylinder shall run many reciprocal strokes to empty one of two chambers of the large cylinder while simultaneously refill its opposite chamber, thus the reciprocal frequency of large cylinder is only a fraction of the reciprocal frequency of small cylinder.

If switches can make use of max valid volumes of all cylinders, then frequency ratio equals the valid volume inverse ratio; that also means: the larger the cylinder volume, the lower its reciprocal frequency will be.

Subfigure FIG. 11b shows a pure mechanical VFD version, comprising a small cylinder, a large cylinder, 4 pieces of sheathed steel cord push/pull soft shafts (aka Bowden cable) for rods range limitation, pusher bar $C_a$ for active cylinder, pusher bar $C_p$ for passive cylinder, necessary hydraulic hoses, a direction valve, and the ball-pen style mechanism that can toggle valve state.

At proper moments of pistons approaching but not touching dead points, those soft shafts will be pushed by rods of cylinders, against the lever of ball-pen like actuator, in turn, the responsive valve will change its flow direction.

Because all soft shafts converge at same lever end of the said special ballpen-like toggler, active motion of any one soft shaft will cause all other 3 soft shafts in collective passive motion, though not necessary and it may waste some auxiliary energy.

Some parameters are annotated on the subfigure: ($D_a$ diameter and $L_a$ max half stroke of active cylinder, $\Phi_p$ diameter and $L_p$ max half stroke of passive cylinder, variable span $L_d$ that can be changed by frequency adjuster.

Given all above parameters, if the frequency of active cylinder is $f_a$, then the minimal variable frequency of passive cylinder can be calculated by equation: $f_{min} \approx f_a L_a \Phi_a^2 / (L_p \Phi_p^2)$, and if $L_d$ is changeable, then the dynamic frequency $f_p \approx f_a L_a \Phi_a^2 / (L_d \Phi_p^2)$, where the approximate signs imply the inaccurate result, because the volume calculation neglects the rod's diameter.

The deviation of above approximate formulas may not always be acceptable if rods diameters are not significantly smaller than their housing bore diameters. For high precision, please use this accurate formula: $f_p = f_a L_a (\Phi_a^2 - \Phi_{ar}^2) / [L_d(\Phi_p^2 - \Phi_{pr}^2)]$, where $\Phi_{ar}, \Phi_{pr}$ are respective rod diameters of active & passive cylinders.

Subfigure FIG. 11c shows position changing waveforms of piston rods at different frequency effects, in coordinates of temporal X-axis and spatial Y-axis. The left portion renders curve for the bar $C_a$ position of active cylinder, the right for the bar $C_p$ of passive cylinder, and all positive or negative spatial values are relative to respective reference middle points of strokes. The top dash lines stand for the motion ceilings of all strokes, and the recent-mentioned frequency equation is annotated on this subfigure.

This fluidic VFD is reversible, i.e. the drive & driven sides are exchangeable, even on the fly.

Alternatively, there is another way to change one frequency $f_1$ to another frequency $f_2$: firstly change $f_1$ to zero by a rectifier, i.e. AC to DC; then changing zero to frequency $f_2$ by an inverter, i.e. DC to AC. But this two-step VFD methodology is not reversible and seems troublesome, unless from other point of view or there is other benefit.

In fact, hydraulic inverters have already been presented in prior FIGS. 8 & 9, where regular pump DC oil flow is converted to oscillating AC oil flow as input of AC hydraulic transformer.

Hydraulic oil is independently autonomous inside the 2 interconnected cylinders of any VFD set. If tightly prefilled and zero leak of oil, oil tank is not necessary. However even good sealant may still risk of micro leak, thus long time interval casual oil compensations should have to be done by offline maintenance jobs.

Only in AC→DC→AC VFD set, automatic oil compensation can be done via an inline tank, which is connected with the "ground" port (atmosphere pressure) of the intermediate DC terminals, so that vacuum suck will always keep oil full loaded. Bit in AC→AC VFD set, there is no proper port for air contactable oil tank to connect.

FIG. 12 illustrates how to overcome slow piston by hybrid of pneumatic and hydraulic components. The mid vertical dash line is the border: left portion pneumatic and right hydraulic.

As a thumb rule, hydraulic pistons cannot move faster than 0.5 m/s, and pneumatic pistons cannot move faster than 20 m/s, so as for reliable & efficient working condition.

Many applications need high linear speed, for example, driving cars on highway about 30 m/s, thus high ratio final drive has to be used for amplifying snailish velocity of the hydraulic rod.

It is a good idea to circumvent the speed embarrassment by embedding a section of pneumatic VFD, aka variable frequency drive, so as to interface high and low speed.

The left pneumatic portion is a VFD embodiment of the methods illustrated in previous figure. Because of frequency reduction, now the large pneumatic cylinder can move as slow as a hydraulic cylinder, though its partner small pneumatic cylinder can act as usual high speed.

The right hydraulic portion is the well described cylinder-train for pressure boost or buck, and it does share a common axis via rigid coupling with the aforementioned large pneumatic cylinder.

Air is engineeringly entrapped in the said pneumatic VFD, and to rigidly transfer force for power transmission, the prefilled air should have enough pressure, so as not to behave as a sponge.

In the common axis, the right cylinder-train does not care about pressure in the fluid-isolated left pneumatic cylinder that is also a partial of the pneumatic VFD sub-system, but does care about the pneumatic force, and then there is the pneumatic actuating pressure=force/area.

In this figure, it is the spur, or say reciprocal power source, that can drive the small pneumatic cylinder as fast as 20 m/s, therefore, the spur also does not care much about the air pressure.

Attention: the so-called "actuating pressure" is not static pressure or base pressure of the internal autonomous air, but it virtually floats on the base pressure. Therefore, to make internal air medium look rigid, its base pressure should be larger than the max actuating pressure.

As the autonomous air may leak at a slow rate, even sealed by the best gaskets, thus the base pressure could decrease to an unacceptable extent after long time usage. To maintain a decent base pressure, a backup air compressor is a must-have for leak makeup.

To emphasis on hybridity, some drawing details are covered; instead function schemas are used, such as the block with annotation text "valve toggler for varying freq", the hydraulic portion with label "N-bit digital cylinder bunch &|more".

This hybridity also suggests that pure air cars may be inferior, not promising, even optimizing air motor not a worthy effort.

FIG. 13 illustrates schema of 4 bits analog to digital converter example with dials embodiment. It is a pure mechanical A-D converter, made of cheap materials, without any electronic parts.

For 4 bits binary number, it has 16 different values. By using 4 dial wheels, all 16 values can be sequentially hard-coded on surface of a set of co-turnable wheels, thus the analog range of 0° to 360° angle can linearly correspond to the digital binary number.

One cam on a dial wheel can stands for one bit at value 1, and if non-existence, then valve is 0. The upper portion of the figure shows all 4 code-ready wheels, and the lower portion shows the assembled A-D converter. To simplify drawing, the legend "C" is used to represent a cam.

Every dial wheel has a unique pattern of cams setting, and is annotated with numbers 0 to 15 evenly distributed around the circle, and the number is supposed to render a resultant value when this wheel is combined with all rest wheels by aligning same number in a line. On the synchronous co-turnable condition, numbers (0 to 15) alignment is always fixed at any runtime.

After properly fastening all wheels as a whole rotatable component, let analog signal to turn it, then to digitally code the signal is just like as to quickly look up a table.

In general, the minimal turn angle equals $360/2^N$ for an N bits A-D converter or coder with N pieces of dials, so as to change to a different binary number from any current one, for example herein 4 bits, 4 dials, the minimal angle=22.5°.

With adequate shape design & installation, a cam can easily turn on or off an electric switch, even be possible to directly actuate a spool valve with proper cams strength and displacement.

There is also a concept of minimal torque that must be satisfied for workable operation. The minimal torque is dependent on what type of actuatee faced by the cam actuator. If an actuatee is just a micro switch, then operate the coder needs very tiny torque, else if facing valve plungers, decent torque is required. Anyway, such operation energy is always neglectable.

Although only 4 bits used as example herein, in fact, any other bits can also be implemented by the same way, and with modern plastic molding technology or 3D printers, such components, wholly as a parts, can be easily, cheaply and massively manufactured, as well as striking code values fonts for good display.

Therefore, conventional electronic A-D converter is not the only choice in my related inventions, sometimes, a pure mechanic one may be cheaper or more convenient.

FIG. 14 illustrates the most wanted hydraulic DC boost/buck power supply.

Herein objective is to embody a novel hydraulic power supply; it should tolerate wide instable range of input pressure, as well as automatically maintain good stability, yet by option if wish, support wide adjustable range of output pressure, so as to qualify as a remote distributable power source, or to feed local multiple hydraulic independent users, or more importantly for cleantech industry to enable most energy storage systems.

Its practical input pressure range is about 50 psi to 5000 psi, covering both pneumatic & hydraulic pressure bandwidth; output pressure is stable 4000 psi or so standard value, and adjustable in a reasonable range, once application demands.

Oh yeah, the low threshold is just the regular pressure of tap water, so the ratio of high to low is amazingly up to 100 times!

In prior figures, similar embodiments have been proposed, i.e. FIGS. 8 & 9, where emphases are on features of pump interfaces, RS flip-flop oscillator, & layout choice of linear or nonlinear.

Herein the new objective is the basic abstract frame for many applications, especially for energy storage system, and can even be embodied without an embedded computer.

As shown in the figure, an N-bit mechanic A-D converter can rotate up to max 360°, and is installed at proper proximity to an array of spool valves that are essential parts of the key cylinder-train of a digital AC hydraulic transformer, so as a workable torque plus a valid turn angle will change the collective states of the valves array for regulation purpose.

In jargon of control theory, there must be a closed-loop feedback control for stable output. To regulate pressure, a pressure sampler, a reference pressure, a pressure comparator, and an executer are prerequisite elements or components.

These are met in the schematic figure by a mini customized cylinder with preloaded strings in both chambers separated by piston, as shown about the right bottom corner, where annotation "pressure comparator" is pointing to the said mini cylinder.

The sampler is in left chamber of the pressure comparator, and there is an oil port to connect with output port, of course, this side string is immersed in oil. The reference pressure is provided by the calibratable string housed in right dry chamber.

The executer is the stretchable & retractable rod of piston, and a push/pull soft shaft is used to bridge the executer and the A-D coder.

Concerning the digital AC hydraulic transformer, strikingly shown within the biggest function block about center portion of the figure, it is definitely the hardcore of this power system, therefore, design with enough bits or pieces of cylinders is very important to the performance.

As a matter of fact, almost all kinds of energy storage application have extreme wide energy density spectrum during runtime, mapping to the similar 100 more or less times high to low pressure ratio, thus, for decent pressure resolution and as small regulated ripple as possible, usually 8 bits digital cylinder-train may be good enough for the core hydraulic transformer.

Interfacing with the cylinder-train core, the preprocess is done by a DC-AC inverter that conditions the input DC fluid power for AC reciprocal shaft oscillation, and the applied method is well described in prior FIGS. 8, 9 & 10.

The post-process is done by an AC-DC rectifier, and it can be easily instantiated by a set of 4 check valves, with assemblage similar to any 4-diode bridge rectifier. A hydraulic accumulator is connected with the output port, so as to stabilize pressure. Also an overflow valve is used, though optional, so as to protect circuit or main micro flow while idle or zero load.

Both for preprocess and postprocess modules, there have drawn respective function blocks with figurative symbols inside for intuitive presentation and better understanding.

Depending on fluid media choice or application preference, the input side and output side can share one tank/reservoir or instead use two separate tanks. The dash line between 2 tanks implies there may be only one common tank.

For large scale hydraulic power supply plant, cooling measure must be taken for operation safety and liability. Radiators or heat sinks should properly mate with the Zener-like overflow valve and rectifying check valves, even circuit of forced cooling hydraulic oil has to be considered, and the simple mechanical computing should be replaced by modern electronic computing controller, so as to fully fledge the system overall performance.

With this gateway-like important invention, many those past never succeeded or still dormant projects, now they will become engineeringly feasible, such as the compressed air energy storage system, the osmosis energy storage system, the flywheel energy storage system, the no-gas-phase heat engine with solid versus liquid phase cycle, and the likes that will render super wide variable range of pressure or salinity differential or revolution or etc. during runtime.

FIG. 15 illustrates a novel vehicle hydromechanical transmission with regenerative brake.

This figure is very complicated, so let me firstly brief it by coarse functional block, then detail it in very lengthy paragraphs, and plug in more enough background & purpose & data description.

The left top subview shows the 4 bits hydraulic cylinder-train & respective associated valves.

The left bottom subview shows the simple speed reducer by a pair of chained sprockets, which smaller sprocket is coupled with engine shaft, and larger one converts torque to thrust on the cylinder with annotion "brake regen" in the figure.

The actuation of said cylinder will depend on condition of the beside hydraulic accumulator aka energy storage, and if the accumulator' pressure is high enough, then use the energy storage in assistance to engine shaft for forwarding power, else a valve will shortcut the said cylinder.

The right top subview shows the controller, gas pedal, brake pedal, shifter handle, the final drive cylinder, and respective peripheral parts.

The right bottom subview shows the simple speed-upper.

Below is the detail description of the current figure, until next figure number is presented.

For pure fossil fuel powered vehicles, to increase efficiency, makers & engineers have done their best efforts to improve engines and transmissions, but they still not yet massively commercialize any regenerative brake technology.

In fact, it is the brakes that are the greediest hidden fuel eaters. Here is the scientific data: Assuming a car weight 1000 kg or 1 ton, running at 100 km/h, then quickly brake to stop, kinetic energy $0.5*1000*(100,000/3600)^2=386$ kJ will become waste heat; The regular efficiency is 20% from fuel to wheel, so the 386 kJ kinetic is equivalent to 1930 kJ heat; The average gasoline (density 0.75 kg/L) heat value 45 MJ/kg or 34 MJ/L, so the 1930 kJ heat, or say one time brake is equivalent to 0.057 L or 57 ml or 57 cc. For heavy trucks, one time brake may waste 1 liter fuel, or for modern trains, one emergent brake could cost hundreds liters of diesel, even derail!

This invention integrates 2 disruptive innovations: the hydromechanical automatic transmission, quasi continuously variable, one of a kind; and the hydraulic full regenerative brake.

Traditionally a DC hydraulic pump & a DC hydraulic motor at least should exist at the frontend and backend of the entire powertrain, but creatively these expensive picky stuffs are no longer too much welcome in this invention, though if insisted, they may be still optional. Instead all hydraulic parts can be regular cylinders, spool valves, auxiliary parts and hoses. In facts, herein economical cylinders do function as AC hydraulic pumps and AC hydraulic motors.

Limited by page size, in this figure I only draw 4 bit cylinder-train as the kernel of system, though 5 or more cylinders practically better for car application. Even 4 bits system, it still has 16 shifts, far better than those conventional ~6 shifts of manual or automatic car transmissions.

In car application, engine power or rev spectrum width is relative narrow, even unstable oil pressure doesn't matter, so less bits cylinder-train is favorable.

Which application needs as many bits or cylinders as possible? Generally speaking, the wider the energy density or power spectrum, or the higher the max power, or the heavier the max load, then the more the bits or cylinders should have.

For example, nowadays, locomotives use about 5 MW diesel engines, and in my viewpoint, the fashionable electrification may be a reluctant expensive choice by firstly letting engines drive electricity generators, because extreme heavy loads need great performance CVT or hundreds gears transmission to handle, as desirable as regenerative brake, however conventional transmissions hard to do, but electrical motors easy to do. Fortunately, this invention with 8 or more cylinders will automatically provide 256 shifts as well as brake energy regeneration, so it can be proudly imagined as a heavy duty quasi continuously variable transmission.

Specially, the bidirectional symmetrical drivability is also a basic demand for locomotives, as changing a power unit from head to tail is quite a trouble: railway switchmen's cooperation. Conventional transmissions disallow fast drive in reverse gear; comfortably this novel one can drive a vehicle at same fast speed forward or rearward. All in all, it will be a highly competent choice for locomotive application.

About the Main Frame of Digital Hydromechanical Powertrain

For vehicle application, it is never the purpose to maintain constant hydraulic pressure, thus it is not much necessary to put cylinder-train on primary side of AC hydraulic transformer in favor of linear pressure regulation.

Instead herein the cylinder-train is deployed on secondary side of AC hydraulic transformer, so as to let engine directly drive the common shaft via the simplest crank-rod mechanism, and also let a peculiar cylinder insert before AC hydraulic transformer on the primary side. The peculiar cylinder serves only the sub-system of brake energy storage & recoverage.

There is no dead point for a crank-rod mechanism that converts rotary to reciprocal motion, but vice versa, it does have 2 dead points if converting reciprocal to rotary motion.

I have a minor trick to improve mechanic performance or overcome the dead or weak points: as shown in the figure, a fork is fixed on the common shaft of a bunch of cylinders, with anchor point nearby the pivot of the crank bar, its 2 lateral branches look like hooks, and the 2 branch trunk lengths are calculatedly different, so that the fork can be impulsively pushed at one time and pulled at another time by the radial spur or cam fixed on the crank wheel during 360° full turn. There is 90° between the spur radial line and the radial line that goes through the eccentric pivot pin on crank wheel, thus, while the crank bar is at zero torque position, i.e. dead or weak points, the spur can still impulse the fork at max momentary torque.

The above tricky option needs extra space, and the shapes of cam & spur are sensible to the last effect, thus tuning & break-in period are inevitable. If feel troublesome, just forget it.

Of course, if not care about cost & space sprawl, why not to use two separate reciprocal power tracks with 90° phase differential? It will be better in performance than the pulse spur fork.

For crank-rod mechanism, the rod driftable range equals the diameter of crank-pin lying circle, thus cylinder's length must be larger than the said diameter. With consideration of piston's & endcap's thicknesses, rational cylinder's length should reserve enough margins so as to avoid of impingement. However, too lengthy is also unwanted.

The electromagnetic spool valves array of cylinder-train is governed by the computer-based controller. If using non-electromagnetic spool valves, then a mechanic A-D coder is needed, and let the controller drive a stepper motor that couples with the A-D coder.

The backend uses same but inverse crank-rod mechanism. A touch of nostalgic!? Yes, same thing as last century steam engine powered locomotives, just with the option of my magic pulse spur fork and without the intricate Walschaerts valve gear for steam cylinder.

Another option for both frontend & backend: for lesser vibration, a piece of counter weight aka balancer is better to be added to every crank wheel at proper eccentric position.

Because frontend & backend both use crank-rod mechanisms, so the reciprocal stroke ranges of both sides are fixed, therefore there must exist a variable frequency conversion bridge to couple them, and it is realized by the computer-controlled electromagnetic spool valve between cylinder-train and the final cylinder, as shown about center of the figure.

As to gears shifter, just like any automatic transmission, there are three basic shifts: Drive & Neutral & Reverse, though for manual transmission, the Drive gear is an abstract concept and will be further splitted to many real different shifts.

For a reciprocal motion itself, there is no concept of Drive or Reverse, only when the reciprocal motion is converted to rotary motion, then there is concept of direction, and it is the random parking orientation of crank pin on the directly driven wheel that determines how to control vehicular motive direction.

For example, assuming the final cylinder is vertically installed, the crank pin parking at right side before starting, just as exactly shown in the figure, also assuming clockwise rotation corresponds to forward motion or "Drive", then the cylinder's first stroke must be downwards for "Drive", otherwise if first stroke upwards, it will be "Reverse" thenafter.

Therefore, the first stroke direction of the final cylinder piston is always calculated at all starting times, thanks to computer-based controller that makes calculation & valve actuation easy, if not, additional clumsy and delicate mechanism has to do boolean calculation as those were used in historical steam trains.

The shown crank zone sensor can judge which initial side the crank is lying while from parking to starting, and usually an optoelectronic circuit can function it and send the data to controller.

The neutral shift can be realized by many simple means, such as disengage clutch if equipped so, or shortcut all bits of cylinder-train.

Unlike the stereotype, herein the gear shifter simply reports its settings to the controller, and encourages CPU to make decisions or take actions for proper drive.

As to the gas pedal and brake pedal, the former is no different with regular one, but the latter is totally different with a traditional one, with a breakthrough innovation of regenerative brake, that is seamlessly integrated to subject digital hydromechanical transmission.

About Regenerative Brake

Let current focus shift to the regenerative brake now. Basically it is a progression of inertial energy storage and replay for fuel saving.

Good methodology should reuse the same transmission reversely then forwardly across both frontend and backend, so as to flexibly and safely control the hardness or softness of deceleration then acceleration, by taking advantage of transmissional ratio.

Otherwise if storage & recovery all in backend or near tires, without transmission involvement, the progression may be too jerky even dangerous in busy traffic. By analogy, a fully charged super capacitor or car battery may be seen spectacular melted lead wires and heard loud sparking noise, if uncontrolledly shortcut its two poles, because of too fast discharge.

Outsiders may not know that braking power is far larger than the engine, even by many times. For example, a car with nameplate power 120 HP engine, during a typical 2 seconds emergent braking event from 100 to 0 km/h, its braking power is about 200 kW=270 HP, in contrast, its highway cruising power normally ~15 kW. Therefore the challenging brake energy storage will frustrate all traditional transmissions, even mushroom internal gears, if dare to try inverse use.

All market-ready transmissions are just designed for normal forward usage, and never for intentional reverse usage, though in a short range it may work. In contrast, with invention of this digital cylinder-train hydromechanical transmission, everything is getting straight & simple, and the transmissional ratio can even be managed by AI (Artificial Intelligence) of robot cars.

Look, the regenerative brake sub-system is embodied in the compound block between frontend & backend crank-rod mechanisms, about the middle lower portion in the figure.

It comprises an exclusive cylinder annotated as "brake regen", a shortcut electromagnetic valve for toggling storage or recovery state, a hydraulic accumulator for brake energy storage, an exclusive tank, a set of 4 check valves for hydraulic rectification, an electromagnetic spool valve for energy recovery by alternatingly feed to the primary side of cylinder-train, and a pressure sensor for monitoring the accumulator by the controller.

The accumulator volume can be determined by the rated max inertial energy divided by energy density of pressurized oil. For a typical 5000 psi accumulator, its energy density is about 34 MJ/m$^3$, thus for the afore calculated 386 kJ inertial energy of 1 ton car, minimal oil volume=0.386/34=0.011 m$^3$ or 11 liters, and considering 1.5 service factor, then 16 liters sounds OK.

During normal run time, the engine alone supplies all power, and the valve across 2 oil ports is turned on for shortcutting oil flow, so the fluidic resistance is neglectable.

Once brake pedal pressed, then the shortcut valve is turned off, and the transmission is in reverse usage, with pressure linear adjustability on cylinder bits. Now, the bridge rectifier will enable brake regen cylinder suck in oil from the air breathable tank by vacuum-atmosphere pressure differential, then stack up pressured oil to the accumulator.

When brake pedal gradually released, then the shortcut valve is still turned off until full release of brake, again the transmission is in normal forward usage, now the controller will oscillate the electromagnetic spool valve by accurate timing of ON & OFF, so as to temporarily power the entire system by the accumulator.

To harmonize engine & the brake energy regenerator, the engine is better to delivery power via a freewheel, so as to float the main power over regenerative brake power. Even without the freewheel, controller can still insert the regenerated power to the main power, in accord with engine pace, despite the software shall be much implicated.

A crank zone sensor can also be deployed at frontend crank-rod mechanism, so as to facilitate proper control on rotation direction during transmission reverse usage by brake energy storage.

Alternative choice: use electromagnetic clutch to replace the freewheel & zone sensor. Needless of clutch pedal, just control it by a solenoid, as shown in the figure.

Above arrangements make the parallel-drive or time multiplexing drive possible, i.e. engine and the charged accumulator can simultaneously drive the cylinder-train if use a freewheel, or each monopolizes in respective time slot if use a clutch.

Usually the storage accumulator is given the highest priority to empty its energy as soon & necessary as possible during the early de-brake then re-acceleration transition, so as to be ready for next brake event.

Safety should always be given the highest priority. As a secondary measure, the conventional disk-caliper brake is still recommended in place.

The existence of secondary brake choice can enable the regenerative bake only to act on high value inertial energy, so as to economically concentrate the smartest technology on the worthiest narrow demand. For example, a threshold pre-brake speed can be set to 20 km/h, and let regenerative brake to act if faster than the threshold, else let the caliper brake to act.

In fact, it is also not worthwhile to reclaim brake energy if a car in reverse gear, because either the reverse speed is very low or bidirectional regenerative brake is complex.

Too often regenerative response to re-brake event should also be avoided, because the accumulator may not get enough time elapse to discharge previously charged brake energy.

Considering above three factors, my bidirectional quasi full regenerative brake invention can be further simplified for popular vehicles in many aspects: software, hardware, mechanism.

About the Computer I/O Interfaces

At least, these three key parameters are must-have data for proper control logics: pressure, flow rate, realtime positions of shafts, and they can be directly or indirectly acquired by the controller via different sensors or meters.

The most often applied three modes of control can be done with two parameters of pressure and flow rate: constant pressure, constant current and constant power. In math, the system power is determined by the product of pressure and flow rate.

Although a fluidic VFD or any other mechanism with rod range limitation needs only the boundary position data of shafts, however all realtime intermediate positions data do matter, because they can be used to calculate shaft or piston velocity, direction and flow rate, because direction can be determined by the sign of velocity, and flow rate=velocity*active area of cylinder. Thus, inline flow sensor is needless, unless a flow meter for dashboard display if prefer.

In fact, constant travel speed is the most wanted mode, however it is equivalent to the constant current mode, because hydraulic oil flow is determined by piston speed, and final cylinder piston speed determines tire speed.

Every engine has a power-rev curve, and the question of how to optimistically match the curve must be taken to consideration for best working condition and high efficiency, so as to save fuel.

There are other auxiliary data input interfaces around the controller, such as gas pedal realtime position, brake pedal realtime position, gear shifter position, crank zone sensor, even oil and environment temperatures though undrawn in the figure.

The realtime data of brake pedal & gas pedal can be used to analyze driver's determination & emergency degree by software, so with it to adjust the bits of cylinder-train at proper pace. Even emotion or mood can be guessed by artificial intelligence software.

As to tachometer for engine or final wheel, it is not a must-have, unless for convenient redundancy, because rev RPM (Revolutions Per Minute) can also be deduced by software from positions data of both cylinder-train & final shafts.

About Frontend Reducer and Backend Speeder

Peers may wonder why there are a speed reducer at frontend and a speeder at backend. In fact, it is also my reluctant choice, because it is the slow allowable velocity <0.5 m/s of hydraulic cylinder rods that calls the reducer & speeder in place.

Anyway, as the ratio is fixed, both reducer & speeder are simple, even chain & sprocket can be used, as long as heavy duty capacity is well met.

The usual rev speed of engines is circa 2000 RPM, or one turn will spend 60/2000=0.03 seconds or 30 ms, and every half turn or 15 ms will drive cylinder piston travel one stroke length in a crank-rod mechanism, therefore without reducer insertion, to keep rod velocity less than 0.5 m/s, the working stroke length shall be less than 0.5*0.015=0.0075 meters or 7.5 mm.

Obviously the 7.5 mm stroke is too short for a hydraulic cylinder, even the insensitive length can be about 3 mm for actuating a joystick of a direction valve. If the stroke can be amplified by 10 times, then the 7.5 cm is engineeringly acceptable. Thus, a proposed reducer with 10× ratio is definitely necessary, unless inserting a pneumatic-hydraulic adaptive stage.

The similar rationale is also true to the final drive, thus, by tailing the reverse usage of same kind crank-rod mechanism, a speeder is needed.

On-road speed is same with the tire's circumferential velocity. As it is feasible to amplify circumferential velocity by co-shafting two different size wheels without change of rev speed, thus additional RPM-changing speeder may conditionally be unnecessary, if the vehicle is type of SMV (Slow Moving Vehicle <40 km/h) or simply has big enough tires, e.g. farmer's tractors.

Usually vehicles have differential final drive, especially those rear drive vehicles or most trucks, therefore, the speeder does not have to use chain-sprocket drive, but can be directly implemented by the conventional differential gears bridge.

About the Move-Off Transition and Max Torque

As to vehicular move-off transitional stage, amongst all driving conditions, this stage needs the highest torque. Much proudly, hydraulic cylinders are so easy to exert huge big force for whatever torque, even in old times, those engines with far inferior steam pressure can start locomotives with the same kind crank-rod mechanism.

In contrast, during stable cruising stage, as the drive torque is greatly reduced, the runtime hydraulic pressure merely renders a fraction of the starting pressure, perhaps equivalent to the level of a pneumatic system.

The controller will automatically set the working mode to constant power mode or constant high pressure mode for the starting stage, then constant current mode for the cruising stage.

The rev ratio of engine to tires reaches the highest extent during move-off early transition, far beyond the available max ratio of conventional manual or automatic transmissions, thus, it is necessary to "corner-grind" rev ratio for prevention of stall, no matter how temporary low efficient, that is why the clutch pedal has to allow ajar depression in a manual car, though friction odor may smell; or the torque converter has to allow speed differential in automatic car, though internal oil is heated.

By properly designing cylinder-train parameters, it is possible of no more or much fewer such rev ratio "corner-grinding" moments. Even optionally equipped with an electromagnetic clutch for neutral shift, this clutch type does not support ajar press-down, and is not installed for regular left foot depression. For less bits cylinder-train, e.g. 3 or 4 pieces, a regular torque converter is recommended to lead the powertrain, just as a regular automatic car does.

Some Key Parameters Tentative Calculation for Pilot Study

Before ending description on this figure, as a tip to peers, I show how to configure parameters for car final hydraulic cylinder, and peers can try to calculate all other cylinders with reference to this courtesy example.

Transmission design should be based on the highest braking power, not on engine power. Given aforementioned 200 kW braking power, max pressure 5000 psi or 34 Mpa, max rod velocity 0.5 m/s, rod diameter 2" or 5.08 cm, then:

The max flow rate=200 kW/34 Mpa=5.9 L/s=5900 cc/s, active area=5900 cc/s/50 cm/s=118 cm$^2$, bore diameter=$(4*118/3.14+5.08^2)^{0.5}$=13.3 cm=5.22"; max crank thrust=200 kW/0.5 m/s=400 kN=40 tons.

A good design should consider service factor for reliability, and also size standardization, so rounding the bore size to 6"; Its length should be larger than the invariable working stroke, not include the rods extension, e.g. if the crank radius is 3", then length 10" sounds good; shortest time=2*3"/0.5 m/s=0.3 seconds for single stroke; max torque=400 kN*3"=30480 Nm=22494 ft-lb, and if torque ratio of the final drive speeder is 10×, then tire wheel max torque 2249 ft-lb, over huge for driving any car, and cruise rev=10*60*/(2*0.3)=1000 RPM.

Given average car cruise energy consumption 17 kwh/100 km by empirical data, or cruise power 17 kw at 100 km/h, hence, cruise oil pressure=17 kw/(0.5 m/s*118 cm$^2$)=2.9 MPa=420 psi. Obviously at most runtime, all hydraulic cylinders will run about the level of pneumatic pressure, except the real hydraulic pressure during the move-off ~10 seconds acceleration. Engineeringly, if a hydraulic cylinder works on the low level of pneumatic pressure, the 0.5 m/s limitation of rod velocity can be enlarged by somewhat extent.

If a low-end version without regenerative brake is planned for market diversification, then based on a lower engine power, the final cylinder bore size can be significantly reduced.

FIG. 16 illustrates a modification on previous version.

Because most details have been disclosed in description of prior figure, therefore, herein a mode of differential description will be exercised, i.e. only those discrepancies will be briefed to avoid unnecessary repeats, also most original annotations are removed for better clarity of graphic elements, and peers must firstly comprehend the previous figure, so as to understand this new contents contained invention.

A minor modification is the elimination of the spool valve that originally is used for fluidic VFD function. Now, the reciprocal frequency keeps same, i.e. the final cylinder is just a simple follower of the cylinder-train.

Anyway, above modification is an optional simplification, may be good for specific applications, where the final cylinder is allowed to occupy more space, because its volume must be big enough to hold all hydraulic oil that is squeezed from the fully loaded cylinder-train, i.e. all bits corresponding cylinders are switched to state ON.

The major modification is at the backend after the final cylinder, where the previous crank-rod mechanism is totally replaced by a new mechanism without any dead point.

The new mechanism essentially looks like an improved bicycle-style drive mechanism, which key components are a pair of freewheels+chain-sprocket assembly, as shown in the figure.

The reciprocal motion of final cylinder rod is converted to one way rotary motion at top efficiency, because thrust force is 100% utilized to generate torque, unlike the partial utilization in a crank-rod mechanism, where always exists a dynamically changing angle between force vector and crank arm.

Forming a partial section, the whole cylinder's rod is inlined in the driving loop, and its movable range can be arbitrarily set, as long as cylinder body allows, unlike the length-fixed stroke range in a crank-rod mechanism.

Because of the loop oscillatory motion, full chain can be not necessary, even it is possible to interleave partial sections of chains and ropes, so as to lower cost. For example, the marked section about middle right in the figure, it could be steel rope, and the annotation "may be non-chain if too long" just emphasizes the possibility.

If the minor modification option is not applied, i.e. the fluidic VFD still exists, and if the controller software prefers to take full advantages, then whole system can become a real CVT, no longer quasi CVT, because now the reciprocal range of final cylinder can be continuously adjusted, and this will render further higher flexibility.

As the keep of VFD makes real CVT possible in this improved system with freewheels as final drive, thus the bits count of cylinder-train can be shortened by some extent, e.g. from 6 bits to 4 bits, so as to save cost & space yet still maintain higher performance.

It is a common sense that bicycles cannot be driven rearwards. That is why the same simple freewheels cannot be used in this major modification, because motorized vehicles need both normal forwards and rearwards navigation. Instead herein the workable freewheels should be specialized with adjustable three states: 2 states of different driving directions+1 idle state.

Technically it is not hard to make this special freewheels, because even those cheap ratchet wrenches are available everywhere in markets, and they do have the said three states. Frankly say, it is the inside toggleable claws or sprags that make this function workable. For easy controllability, herein special freewheels should be also capable of being dynamically adjusted by electromagnetic actuation, for example, via Bowden cable linked solenoid.

As the two freewheels share a common shaft and are twined by same chain section or loop but towards mutual opposite directions, thus they must keep same preset direction so as to normally drive forwards & rearwards. This idea is not novel, even an old (year 1903) French patent FR338127 has disclosed a retro-direct bicycle with similar mechanism, and a recent invention WO2014/028782 also brought out freewheel-tandem mechanism: Improved Sprague Gear Transmission.

In fact, those two freewheels alternatingly drive during the reciprocal motion of final cylinder, i.e. one works while another rests, because freewheels will be really free of duty if "pretend" to drive towards the counter direction of the preset drive direction.

Supposedly a regular freewheel should transfer power only in the preset direction, though reverse transfer is also possible in the counter direction if intentionally to do so. Now the intention does exist, because the post-brake inertial energy needs to feed back through freewheels+transmission to the frontend storage accumulator.

In contrast to modes of normal forward & rearward drive, the regenerative brake mode needs different settings to the pair of freewheels.

Abstractly speaking, the normal mode is the type of AC-to-DC, because reciprocal motion can be thought as AC oscillation, and tires one way rotation as DC motion; vice versa, the regeneration mode should be the type of DC-to-AC.

AC-to-DC can be naturally done without auxiliary energy assistance, e.g. the 4 diodes bridge rectification, or the 4 check valves bridge fluidic rectification; but DC-to-AC needs auxiliary energy assistance, e.g. the 4 thyristors bridge inversion needs auxiliary trigger signals.

Therefore the regeneration mode also needs help from the controller for changing herein two freewheels states, i.e. alternatingly let one engage its claw(s) in proper direction while let another disengage its claw(s) so as not to block reverse transfer of inertial energy; and the engaged one always has preset direction opposite to the pre-brake preset direction.

Does the crank-rod mechanism seem to not obey above rule? Not really, because its DC-to-AC version pays the price by low efficiency & two dead points, that loss is even far more than the required auxiliary energy in this dual freewheels switching mechanism.

In the bottom portion of the figure, there is a lookup table of settings of the freewheel-pair, which illustrates different gear shifts corresponding different freewheels settings of normal mode and regeneration mode.

Once again, there are many choices for neutral gear shift, and disengaging both two freewheels also works, though an optional clutch can be employed after the engine shaft.

Freewheels allow float overdrive, i.e. if the drive speed in preset direction is less than current speed of the driven wheel, then the effort is futile or "fake busy" idle, therefore, the calculated speed from realtime positions data of final cylinder shaft, in fact, it cannot be used to further calculate vehicle travel speed. That is why an exclusive tachogenerator is drawn in the figure.

Although no change to the frontend crank-rod mechanism, however it is still open for further modification to replace with freewheel-duet DC-to-AC mechanism, as while more complicated software there will be. After substitution, the entire system flexibility will render full potential, as nowhere have to adhere constant length of hydraulic cylinder stroke.

Unpleasant noise is the connatural demerit of chain-sprocket system, but modern silent chain or tooth chain technology can easily fix it, and load capacity even greater than meshed gears.

Comparing with the transmission shown in previous figure, because of the float overdrive, this improved one will make riders more comfortable if all advanced technologies have applied, and it is also more efficient.

As the product of heavy duty electro-adjustable three states freewheel is currently not available in markets, hereby I call all interested manufacturers for more relevant inventions or massive production if you resonate with my belief of its beautiful future: all vehicles deserve affordable regenerative brake for saving users money & protecting environment!

Post Scriptum

By the way, don't blame me for late disclosure of this series of inventions, in spite of its maturity for years, because I have been suffering from lack of capital to sustain my R&D mission, even this situation is still jamming many disruptive inventions in my deep brain.

I believe that no inventor likes to see a long time progression of commercialization. Is there the hell any deep pocket guy or entity that can do humankind a favor to support me? It is the high time for those first batch "crab eaters" to earn their credits by catalyzing this breakthrough invention, and surly immense lucrative market is waiting for them to reap. Thanks!

In regular fossil fuel cars, the cost ratio of engine to transmission is coarsely 1:1, and so is the life expectation ratio, thus little value of final scrap. In contrast, remanufacture of durable cylinders may be simple change of some cheap sealants, thenafter the rebuilt powertrain can easily serve other whatever engines or other power sources, thus big reusable value, in turn, it is a hopeful green technology as one of the best fixers of emerging climate problem.

President Trump zealously advocates all fossil fuels with his tremendous wisdom & oracle-ish proclamation, perhaps he could foresee the naissance of this disruptive technology? Yes, human beings should not give up any Great Nature's energy gift, before the most efficient or cleanest technology is discovered, unless all efforts are exhausted & still failed. Apropos, USA political system amounts to the best programmed automatic transmission, so the people never worry about any incumbent presidential driver to tamper, because of the common sense: only manual transmissions may risk tamper incident & only automatic transmission vehicles can realize driverless or autopilot in same easy feel as using idiot camera.

As inventor, I suggest to name this breakthrough invention as Wei-transmission. Alternatively in commemoration of Trump's diversity-envisioned energy policy, by which is my creativity encouraged, also Wei-Trump Powertrain is a suitable name, though Trump climate gedanken is 43 of 44 pages of description still controversial without common conclusion in the scientific community.

The invention claimed is:
1. A method of forming a sequential cylinder train variable force power adder;
   a series of hydraulic piston operated cylinders, each cylinder is a symmetrical dual rod-end double action, each of the cylinders in the train are arranged and linked to operate in synchronous reciprocal motion;
   each next cylinder in the series train is double the cross sectional area of the previous one and half the area of the subsequent one;
   each cylinder has its own valve and fluid port configuration, where each cylinder has four ports, two for the cylinder and two for connection external to the cylinder;
   each cylinder is capable of three switchable states that include;
      one state of shortcutting connecting ports between adjacent cylinders and,
      another state of driving reciprocal motion of the rods in opposite directions and;
      a third state that is idling,
   each cylinder's valves are one of spool valves or electromagnetic valves;
      each cylinder's valve assembly is controlled by a valve-control computer that in addition can control the sequencing of the cylinder's valves between cylinders of the series train;
   cylinder trains are further connected with hoses.

* * * * *